United States Patent
Kodama et al.

(10) Patent No.: US 11,940,347 B2
(45) Date of Patent: Mar. 26, 2024

(54) PRESSURE SENSOR

(71) Applicants: DENSO CORPORATION, Kariya (JP); NAGANO KEIKI CO., LTD., Tokyo (JP)

(72) Inventors: Hiroshi Kodama, Tokyo (JP); Naoki Yoshida, Tokyo (JP); Kaori Miyashita, Tokyo (JP); Eiji Takeda, Tokyo (JP); Nobuaki Yamada, Tokyo (JP); Yoshihiro Tomomatsu, Tokyo (JP); Yasushi Yanagisawa, Tokyo (JP); Yusuke Midorikawa, Tokyo (JP); Shirou Kamanaru, Kariya (JP); Kenichi Yokoyama, Kariya (JP); Inao Toyoda, Kariya (JP); Hisayuki Takeuchi, Kariya (JP); Naohisa Niimi, Kariya (JP); Masao Takahashi, Kariya (JP); Yasutake Ura, Kariya (JP); Kouji Asano, Kariya (JP); Yukihiro Kamada, Kariya (JP)

(73) Assignees: DENSO CORPORATION, Kariya (JP); NAGANO KEIKI CO., LTD., Tokyo (JP)

( * ) Notice: Subject to any disclaimer, the term of this patent is extended or adjusted under 35 U.S.C. 154(b) by 344 days.

(21) Appl. No.: 17/508,249

(22) Filed: Oct. 22, 2021

(65) Prior Publication Data
US 2022/0042868 A1 Feb. 10, 2022

Related U.S. Application Data

(63) Continuation of application No. PCT/JP2020/017819, filed on Apr. 24, 2020.

(30) Foreign Application Priority Data

Apr. 26, 2019 (JP) .................. 2019-085904
Apr. 10, 2020 (JP) .................. 2020-071350

(51) Int. Cl.
| | | |
|---|---|---|
| G01L 9/14 | (2006.01) | |
| G01L 9/00 | (2006.01) | |
| G01L 9/04 | (2006.01) | |
| G01L 19/00 | (2006.01) | |
| G01L 19/14 | (2006.01) | |
| G01L 23/18 | (2006.01) | |
| G01L 1/22 | (2006.01) | |
| G01L 9/06 | (2006.01) | |

(52) U.S. Cl.
CPC ............ *G01L 9/04* (2013.01); *G01L 19/0061* (2013.01); *G01L 19/147* (2013.01); *G01L 19/148* (2013.01)

(58) Field of Classification Search
CPC ..... G01L 9/04; G01L 19/0061; G01L 19/147; G01L 19/148; G01L 1/2293; G01L 9/0055; G01L 9/06; G01L 23/18
See application file for complete search history.

(56) References Cited

U.S. PATENT DOCUMENTS

| | | | |
|---|---|---|---|
| 5,867,886 A * | 2/1999 | Ratell ................. | G01L 9/0055 |
| | | | 29/595 |
| 7,192,819 B1 * | 3/2007 | Padmanabhan ....... | G01L 9/0042 |
| | | | 438/460 |

(Continued)

FOREIGN PATENT DOCUMENTS

| | | |
|---|---|---|
| JP | S60-37177 A | 2/1985 |
| JP | H06-186104 A | 7/1994 |

(Continued)

*Primary Examiner* — Herbert K Roberts
*Assistant Examiner* — Anthony W Megna Fuentes
(74) *Attorney, Agent, or Firm* — POSZ LAW GROUP, PLC

(57) ABSTRACT

A pressure sensor has a stem in which a pressure introduction hole into which a pressure medium is introduced and a diaphragm deformable according to the pressure of the pressure medium are formed, and a strain detecting element which is arranged on the diaphragm via an insulating film and being configured to output a detection signal according (Continued)

to the deformation of the diaphragm. The strain detecting element is configured to have a portion made of polysilicon. A low doping layer having a higher electrical resistivity than polysilicon and a higher crystallinity than the insulating film is arranged between the insulating film and the strain detecting element.

4 Claims, 17 Drawing Sheets

(56) References Cited

U.S. PATENT DOCUMENTS

| | | |
|---|---|---|
| 2005/0193836 A1 | 9/2005 | Yoshida et al. |
| 2008/0223142 A1 | 9/2008 | Iimori et al. |
| 2008/0236290 A1 | 10/2008 | Iimori et al. |
| 2009/0056462 A1* | 3/2009 | Kaneko ............... G01L 19/0038 29/621.1 |
| 2016/0252418 A1 | 9/2016 | Schoot Uiterkamp et al. |
| 2018/0266901 A1 | 9/2018 | Tanaka |
| 2018/0282148 A1 | 10/2018 | Hayashi |

FOREIGN PATENT DOCUMENTS

| | | |
|---|---|---|
| JP | 2001-223449 A | 8/2001 |
| JP | 2002-222910 A | 8/2002 |
| JP | 2017-032489 A | 2/2017 |
| JP | 2017-129540 A | 7/2017 |
| JP | 2018-151191 A | 9/2018 |

* cited by examiner

PRESSURE SENSOR

CROSS REFERENCE TO RELATED APPLICATION

This application is a continuation application of International Patent Application No. PCT/JP2020/017819 filed on Apr. 24, 2020, which designated the U.S. and based on and claims the benefits of priority of Japanese patent application No. 2019-085904 filed on Apr. 26, 2019 and Japanese patent application No. 2020-071350 filed on Apr. 10, 2020. The entire disclosure of all of the above applications is incorporated herein by reference.

TECHNICAL FIELD

The present disclosure relates to a pressure sensor in which a strain detecting element is formed on a stem.

BACKGROUND

Conventionally, a pressure sensor in which a strain detecting element is formed on a stem is known.

SUMMARY

It is an object of the present disclosure to provide a pressure sensor capable of improving reliability.

According to one aspect of the present disclosure, a pressure sensor has a stem in which a pressure introduction hole into which a pressure medium is introduced and a diaphragm deformable according to the pressure of the pressure medium are formed, and a strain detecting element which is arranged on the diaphragm via an insulating film and being configured to output a detection signal according to the deformation of the diaphragm. The strain detecting element is configured to have a portion made of polysilicon. A low doping layer having a higher electrical resistivity than polysilicon and a higher crystallinity than the insulating film is arranged between the insulating film and the strain detecting element.

DETAILED DESCRIPTION

Figure 1:
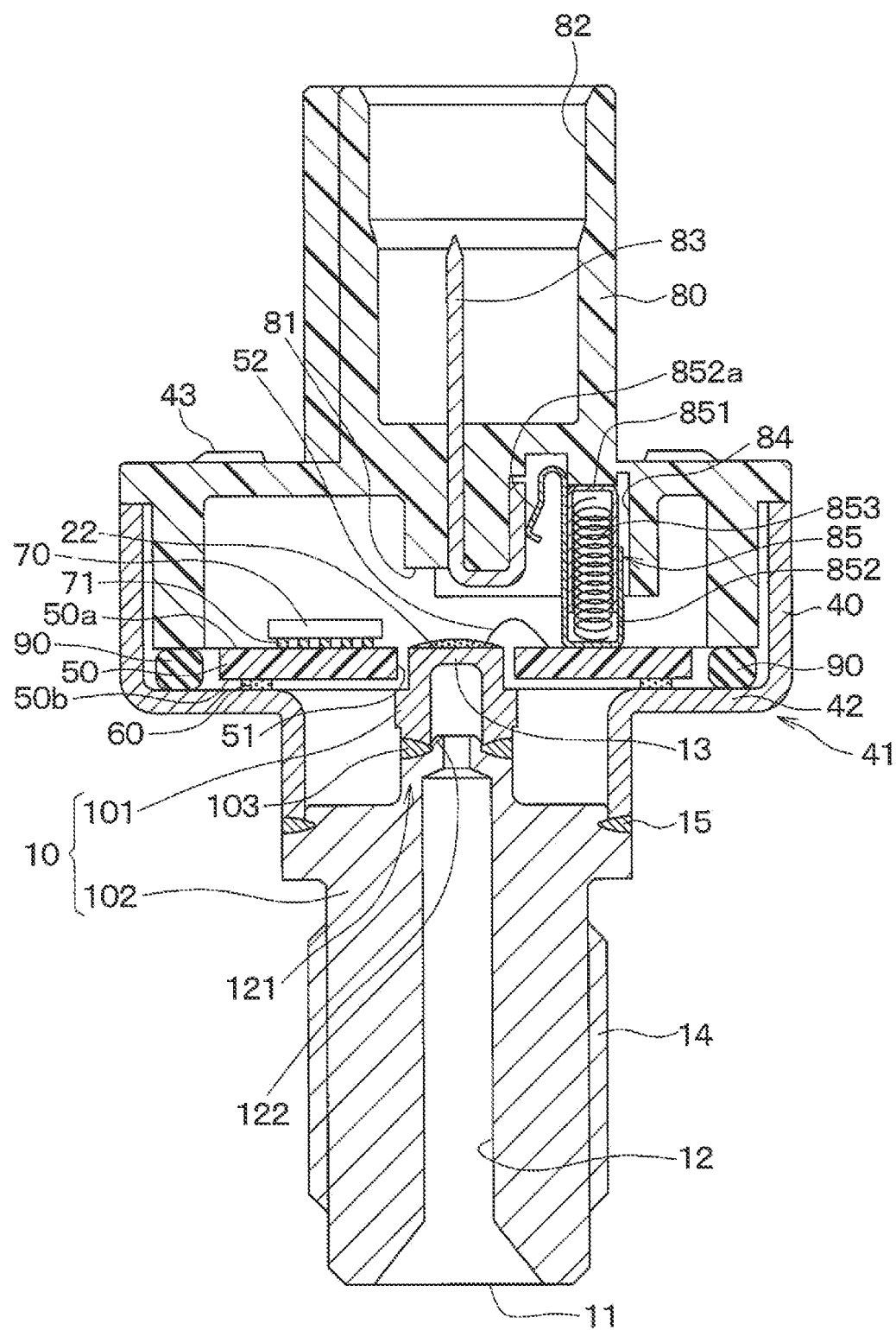
FIG. 1 is a diagram showing an overall configuration of a pressure sensor according to a first embodiment.

In an assumable example, a pressure sensor in which a strain detecting element is formed on a stem is known. Specifically, in this pressure sensor, one end of the stem is an opening to introduce a pressure medium, and the other end is a diaphragm that can be deformed according to the pressure of the pressure medium. A strain detecting element having a gauge resistance whose resistance value changes when deformed is formed on the diaphragm.

By the way, in recent years, it has been desired to further improve a reliability of the pressure sensor as described above. It is an object of the present disclosure to provide a pressure sensor capable of improving reliability.

According to one aspect of the present disclosure, a pressure sensor has a stem in which a pressure introduction hole into which a pressure medium is introduced and a diaphragm deformable according to the pressure of the pressure medium are formed, and a strain detecting element which is arranged on the diaphragm via an insulating film and being configured to output a detection signal according to the deformation of the diaphragm. The strain detecting element is configured to have a portion made of polysilicon. A low doping layer having a higher electrical resistivity than polysilicon and a higher crystallinity than the insulating film is arranged between the insulating film and the strain detecting element.

According to this configuration, the low doping layer is arranged between the insulating film and the strain detecting element. Therefore, an amorphous layer formed between the low doping layer and the strain detecting element can be made smaller than the case where the strain detecting element is directly formed on the insulating film. Further, the amorphous layer is formed between the low doping layer and the insulating film, but the influence of the delayed elasticity of the amorphous layer is alleviated by the low doping layer, and is less likely to be propagated to the strain detecting element. Further, the low doping layer is composed of a material having a higher electrical resistivity than polysilicon. Therefore, even if an amorphous layer is formed between the low doping layer and the insulating film and the low doping layer is affected by the delayed elasticity of the amorphous layer, the influence on the strain detecting element can be reduced. Therefore, it is possible to suppress the change in the characteristics of the strain detecting element, and improve the reliability of the pressure sensor.

Hereinafter, embodiments of the present disclosure will be described with reference to the drawings. In the following embodiments, the same or equivalent parts are denoted by the same reference numerals.

(First Embodiment)

A pressure sensor of a first embodiment will be described with reference to the drawings. The pressure sensor of the present embodiment is preferably used for detecting a combustion pressure of an internal combustion engine, for example.

Figure 2:
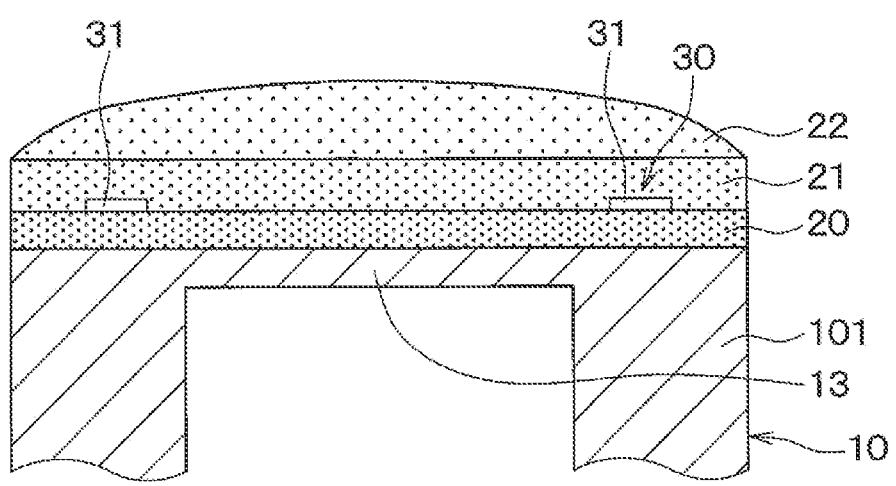
FIG. 2 is an enlarged view of a vicinity of a diaphragm in FIG. 1.

First, an overall configuration of the pressure sensor in the present embodiment will be described. As shown in FIGS. 1 and 2, the pressure sensor includes a stem 10, a strain detecting element 30, a housing 40, a circuit board 50, a connector case 80, and the like.

As shown in FIG. 1, the stem 10 has an opening 11 formed on one end side and a pressure introduction hole 12 extending from the opening 11 toward the other end side, and is formed in a bottomed cylindrical shape. The stem 10 has a diaphragm 13 that can be deformed according to pressure on the other end side. That is, the stem 10 is formed with the pressure introduction hole 12 so that the diaphragm 13 is formed on the other end side. Then, on the stem 10, as shown in FIG. 2, a strain detecting element 30 is arranged on the diaphragm 13 via an insulating film 20.

In FIG. 1, a lower side of a paper surface corresponds to the one end side, and an upper side of the paper surface corresponds to the other end side. Further, in the following, similarly, each member will be described with the lower side of the paper surface as the one end side and the upper side of the paper surface as the other end side. In other words, as will be described later, the pressure sensor is configured by integrating the stem 10, the housing 40, and the connector case 80. Therefore, in the pressure sensor, the stem 10 side is the one end side, and the connector case 80 side is the other end side.

As shown in FIG. 1, the stem 10 is formed with a threaded portion 14 that can be screwed to a member to be attached such as a fuel pipe on an outer wall surface on the opening 11 side. Further, a length of the outer wall surface of the stem 10 in a circumferential direction centered on an axial direction is changed between one end portion and the other end portion. Specifically, the stem 10 has a circumferential length on the outer wall surface on the other end side shorter than the circumferential length on the outer wall surface on the one end side. Then, as will be described later, the stem 10 is joined to the housing 40 by a welded portion 15 at a portion where the circumferential length of the outer wall surface changes.

As shown in FIG. 2, the strain detecting element 30 is arranged on the diaphragm 13 of the stem 10 via the insulating film 20. The strain detecting element 30 has a gauge resistor 31 whose resistance value changes according to deformation, and a wiring layer and a pad portion (not shown). Then, in the strain detecting element 30, the gauge resistors 31 are connected via the wiring layer so as to form a bridge circuit, and the pad portion is arranged on the wiring layer so that each gauge resistor 31 is connected to an external circuit. Further, a protective film 21 covering the strain detecting element 30 is formed on the diaphragm 13 of the stem 10. A protective member 22 is arranged on the protective film 21.

The protective film 21 is formed with an opening for exposing the pad portion in a cross section different from that in FIG. 2. As shown in FIG. 1, in the strain detecting element 30, a pad portion is connected to the circuit board 50 via a bonding wire 52. Further, in the present embodiment, the insulating film 20 is made of a silicon oxide film or the like. The gauge resistor 31 and the wiring layer are made of boron-doped polysilicon. The pad portion is made of an electrode film such as gold or an alloy containing gold as a main component. The protective film 21 is made of a silicon nitride film or the like. The protective member 22 is made of a gel such as a silicone gel.

As shown in FIG. 1, the housing 40 has a tubular shape in which one end side and the other end side are opened, and a distance between the facing inner wall surfaces on the one end side is shorter than the distance between the facing inner wall surfaces on the other end side. Specifically, in the housing, a step portion 41 is formed between one end side and the other end side, and the distance between the facing inner wall surfaces is changed by the step portion 41. As will be described later, the step portion 41 is formed so as to form a mounting portion 42 on which the circuit board 50 can be mounted.

The housing 40 is joined to the stem 10 via a welded portion 15 in a state where the diaphragm 13 of the stem 10 is located on the other end side with respect to the step portion 41. That is, the dimensions and the like of the housing 40 and the stem 10 are designed so that the diaphragm 13 of the stem 10 projects toward the other end from the step portion 41.

The welded portion 15 between the stem 10 and the housing 40 is formed by laser welding, electron beam welding, or the like. Further, a portion of the housing 40 on the other end side with respect to the step portion 41 has a hexagonal outer shape or the like so that a mounting jig such as a spanner can be attached. The mounting portion 42 has a hexagonal outer shape in a planar shape in accordance with the outer shape of the above portion.

The circuit board 50 is composed of a printed circuit board or the like, and has a hexagonal outer shape in accordance with the planar outer shape of the mounting portion 42. Although detailed description will not be given here, on the circuit board 50, an element land connected to a strain detecting element 30 (not shown), an electrode portion land connected to the electronic component 70 described later, an external connection land connected to a terminal member 85 described later, a predetermined wiring pattern, and the like are formed on a surface 50*a* side. The circuit board 50 is arranged on the mounting portion 42 via a joining member 60 so that a back surface 50*b* faces the mounting portion 42 of the housing 40.

Specifically, the circuit board 50 is formed with a through hole 51 penetrating between a front surface 50*a* and the back surface 50*b* in a substantially central portion thereof, and are arranged so that the other end side of the stem 10 is located in the through hole 51. The circuit board 50 is electrically connected to the strain detecting element 30 formed on the stem 10 via the bonding wire 52. Further, an electronic component 70 is mounted on the circuit board 50.

In the present embodiment, the electronic component 70 is composed of a QFN (abbreviation of quadflatnon-leaded package) or the like in which a circuit chip in which an amplifier circuit, a correction circuit, or the like is formed is housed in a case and an electrode portion is formed in the case. Then, the electronic component 70 is mounted on the electrode portion land formed on the circuit board 50 via a solder 71.

A connector case 80 has a columnar shape formed by molding a resin such as PPS (that is, polypropylene sulfide) or PBT (that is, polybutylene terephthalate). The connector case 80 has a recess 81 formed on one end side and an opening 82 formed on the other end side.

The connector case 80 has a terminal 83 for electrical connection with an external circuit. The terminal 83 is arranged after the connector case 80 is molded, for example, but may be integrally molded with the connector case 80 by insert molding or the like.

The terminal 83 is provided in the connector case 80 so that one end thereof is exposed in the recess 81 and the other end is exposed from the opening. In the present embodiment, one end of the terminal 83 is bent toward a terminal member 85 so that it can come into contact with a contact portion 852*a* of the terminal member 85, which will be described later.

Further, the connector case 80 is formed with a mounting hole 84 for arranging the terminal member 85 on one end side. Then, the terminal member 85 that comes into contact with the circuit board 50 while being in contact with the terminal 83 is arranged in the mounting hole 84.

The terminal member 85 is configured to include a base portion 851, a movable body 852, and an urging member 853. The base portion 851 and the movable body 852 are each formed by punching or bending a conductive metal member, and have a U-shaped cross section having a pair of side surfaces and a bottom surface. Further, although not particularly shown, the base portion 851 has a convex portion formed on the side surface, and the movable body 852 has a slide groove formed on the side surface. Then, the base portion 851 and the movable body 852 are assembled in a state in which the convex portions are inserted into the slide groove with the bottom surfaces facing each other and the movable body 852 is slidable with respect to the base portion 851.

Further, although not particularly shown, the base portion 851 is formed with a locking portion for fixing on the side surface. The movable body 852 is provided with a contact portion 852*a* bent on one side surface.

The urging member 853 is formed of a coil spring or the like, and is arranged between the base portion 851 and the movable body 852 so that one end of the urging member 853 presses a bottom surface of the movable body 852 and the other end thereof presses a bottom surface of the base portion 851.

Then, such a terminal member 85 is press-fitted into the mounting hole 84 formed in the connector case 80, and is held in the mounting hole 84 by the locking portion formed in the base portion 851 biting into the connector case 80. The base portion 851 is held in the mounting hole 84, and the movable body 852 is in a slidable state with respect to the base portion 851. Further, the terminal member 85 is held in the mounting hole 84 so that the contact portion 852*a* comes into contact with the terminal 83. More specifically, the terminal member 85 is held in the mounting hole 84 so that the contact portion 852*a* is maintained in contact with the terminal 83 even when sliding.

The connector case 80 is integrated with the housing 40 by inserting one end side into the other end side of the housing 40 and crimping a claw portion 43 formed on the housing 40. At this time, the connector case 80 is inserted so that the terminal member 85 comes into contact with the external connection land formed on the circuit board 50. As a result, the terminal 83 is electrically connected to the strain detecting element 30 through the terminal member 85, the circuit board 50, the bonding wire 52, and the like.

A sealing member 90 such as a gasket is arranged between one end of the connector case 80 and the mounting portion 42 of the housing 40. Then, the sealing member 90 is crushed to seal the internal space.

The above is the basic configuration of the pressure sensor in the present embodiment. In the present embodiment, the stem 10 has a first stem 101 and a second stem 102, which are welded together.

Specifically, the first stem 101 has a bottomed tubular shape having an open end on one end side and the diaphragm 13 on the other end side. The second stem 102 has respectively an open end on one end side and the other end side, and has a tubular shape having the threaded portion 14 on the one end side. That is, the first stem 101 constitutes the other end side of the stem 10, and the second stem 102 constitutes the one end side of the stem 10. The housing 40 is welded to the second stem 102.

Laser welding, electron beam welding, or the like is performed on one end side of the first stem 101 and the other end side of the second stem 102 from an outer wall surface side, and the first stem 101 and the second stem 102 are joined. That is, the first stem 101 and the second stem 102 are joined by the welded portion 103. The welded portion 103 may or may not be formed so as to reach the inner wall surface of the first stem 101.

Further, the second stem 102 has a thin-walled portion 121 on one end side with respect to a portion where the welded portion 103 with the first stem 101 is formed, and the thin-walled portion 121 has a thinner thickness between the inner wall surface and the outer wall surface than the portion where the welded portion 103 is formed. That is, the second stem 102 has a thin-walled portion 121 having a lower rigidity than the portion where the welded portion 103 is formed on one end side with respect to the portion where the welded portion 103 with the first stem 101 is formed.

Further, in the present embodiment, since the diaphragm 13 is arranged on the first stem 101, the first stem 101 is made of a material having higher strength than the second stem 102. For example, the first stem 101 is formed using SUS630 and the second stem 102 is formed using SUS430.

Further, the second stem 102 is formed with an alignment portion 122 inserted into the first stem 101 on the other end side.

Such a pressure sensor is attached to a fuel supply pipe or the like via, for example, the threaded portion 14 formed on the stem 10. Then, in the pressure sensor, when a pressure medium in a fuel supply pipe is introduced into the pressure introduction hole 12, the strain detecting element 30 outputs a detection signal corresponding to the pressure medium. Then, the pressure sensor transmits a detection signal to the external circuit via the bonding wire 52, the circuit board 50, the terminal member 85, the terminal 83, and the like. As a result, the pressure of the pressure medium is detected.

As described above, the stem 10 has a configuration including the first stem 101 and the second stem 102. Therefore, a manufacturing process can be simplified as compared with the case where the entire stem 10 is integrally formed by cutting, cold forging, or the like.

Further, the second stem 102 has the thin-walled portion 121 on one end side with respect to the portion where the welded portion 103 with the first stem 101 is formed. Therefore, the life of the welded portion 103 against fatigue failure can be improved, and a reliability of the pressure sensor can be improved.

Figure 3A:
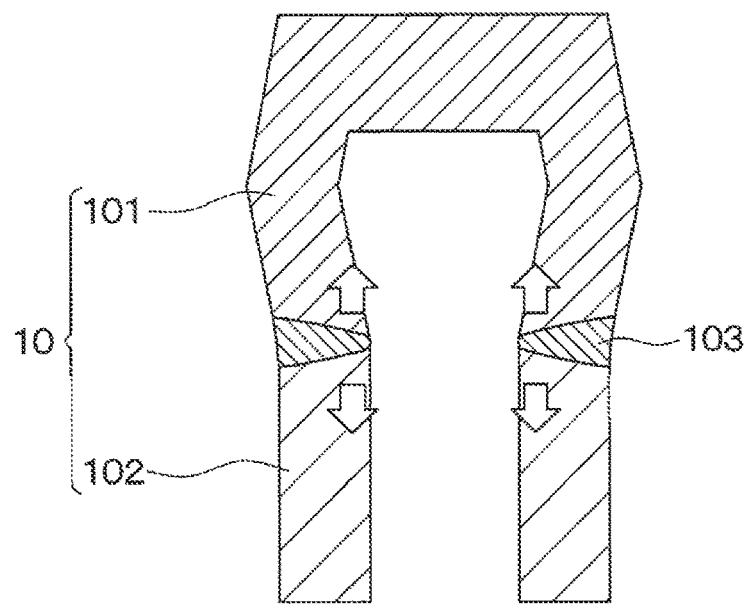
FIG. 3A is a diagram for explaining deformation of a stem in which a thin-walled portion is not formed.

That is, in a case where the second stem 102 is not formed with the thin-walled portion 121, as shown in FIG. 3A, when the pressure medium is introduced into the pressure introduction hole 12, the stem 10 has a deformation fulcrum at the welded portion 103. In this case, tensile stress is applied to the welded portion 103.

Figure 3B:
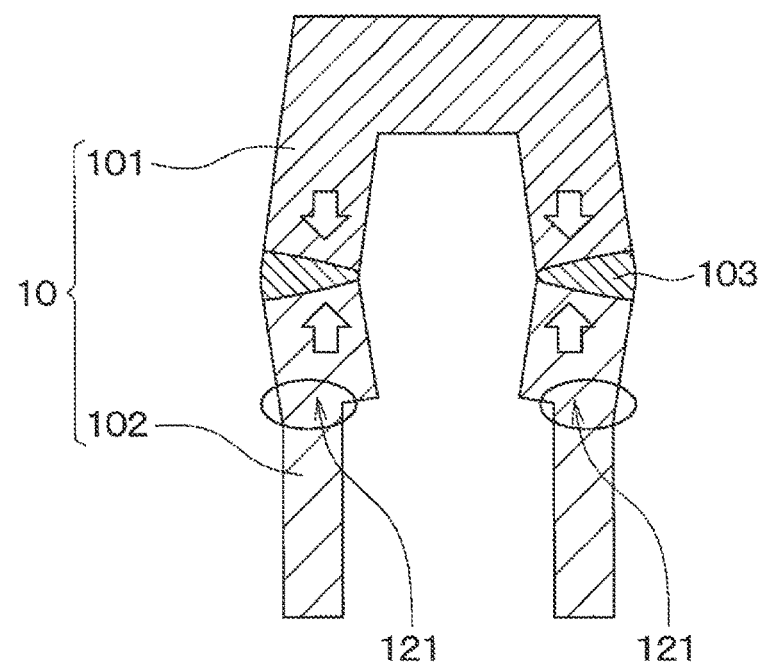
FIG. 3B is a diagram for explaining deformation of a stem in which a thin-walled portion is formed.

On the other hand, in the present embodiment, as shown in FIG. 3B, when the pressure medium is introduced into the pressure introduction hole 12, the fulcrum of the deformation of the stem 10 becomes the thin-walled portion 121. In this case, compressive stress is applied to the welded portion 103. Therefore, in the present embodiment, the life of the welded portion 103 against fatigue fracture can be improved.

Figure 3C:
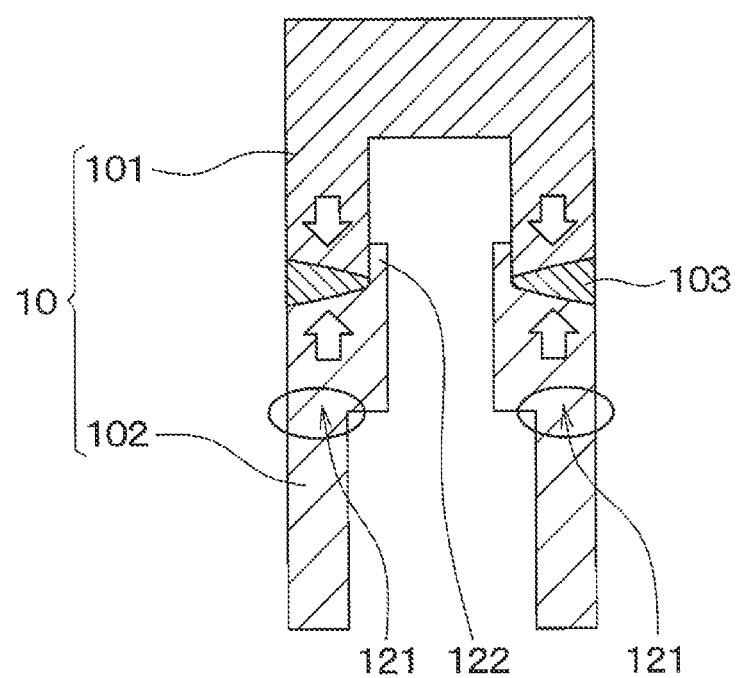
FIG. 3C is a diagram for explaining deformation of a stem in which a thin-walled portion and an alignment portion are formed.

Further, in the present embodiment, the second stem 102 is formed with the alignment portion 122 that is inserted into the first stem 101. Therefore, as shown in FIG. 3C, when the first stem 101 and the second stem 102 are welded and joined, it is possible to suppress an occurrence of misalignment between the first stem 101 and the second stem 102, and it is possible to prevent a workmanship of the welded portion 103 from varying from portion to portion. Therefore, it is possible to suppress that the compressive stress applied to the welded portion 103 varies from portion to portion, and it is possible to suppress the occurrence of local stress concentration. As a result, the life of the welded portion 103 against fatigue failure can be further improved.

Further, in the present embodiment, the first stem 101 is made of a material having higher strength than the second stem 102. Therefore, for example, the strength of the diaphragm 13 can be increased and the destruction of the diaphragm 13 can be suppressed as compared with the case where the first stem 101 is made of the same material as the second stem 102.

Further, the second stem 102 is formed with the alignment portion 122. Therefore, when the first stem 101 and the second stem 102 are welded and joined, the alignment portion 122 may be inserted into the first stem 101, so that the manufacturing process can be simplified.

(Second Embodiment)

A second embodiment will be described. In the present embodiment, a low doping layer is arranged between the strain detecting element 30 and the insulating film 20 as compared with the first embodiment. Descriptions of the same configurations and processes as those of the first embodiment will not be repeated hereinafter.

Figure 4:
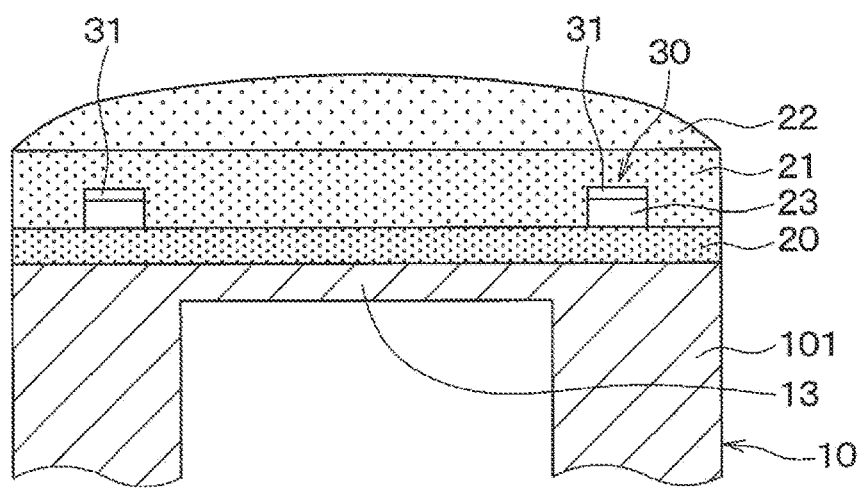
FIG. 4 is an enlarged view of the vicinity of the diaphragm in a second embodiment.

In the present embodiment, as shown in FIG. 4, a low doping layer 23 is formed on the insulating film 20. The low doping layer 23 has a higher electrical resistivity than the polysilicon constituting the strain detecting element 30 and has a higher crystallinity than the insulating film 20. In the present embodiment, the low doping layer 23 is made of polysilicon in which the amount of boron doped is smaller than that of polysilicon constituting the strain detecting element 30. For example, the low doping layer 23 is composed of polysilicon doped with 50% less boron than the amount of boron doped in the polysilicon constituting the strain detecting element 30. Then, the strain detecting element 30 is formed on the low doping layer 23. That is, in the present embodiment, the low doping layer 23 is arranged between the strain detecting element 30 and the insulating film 20.

Figure 5:
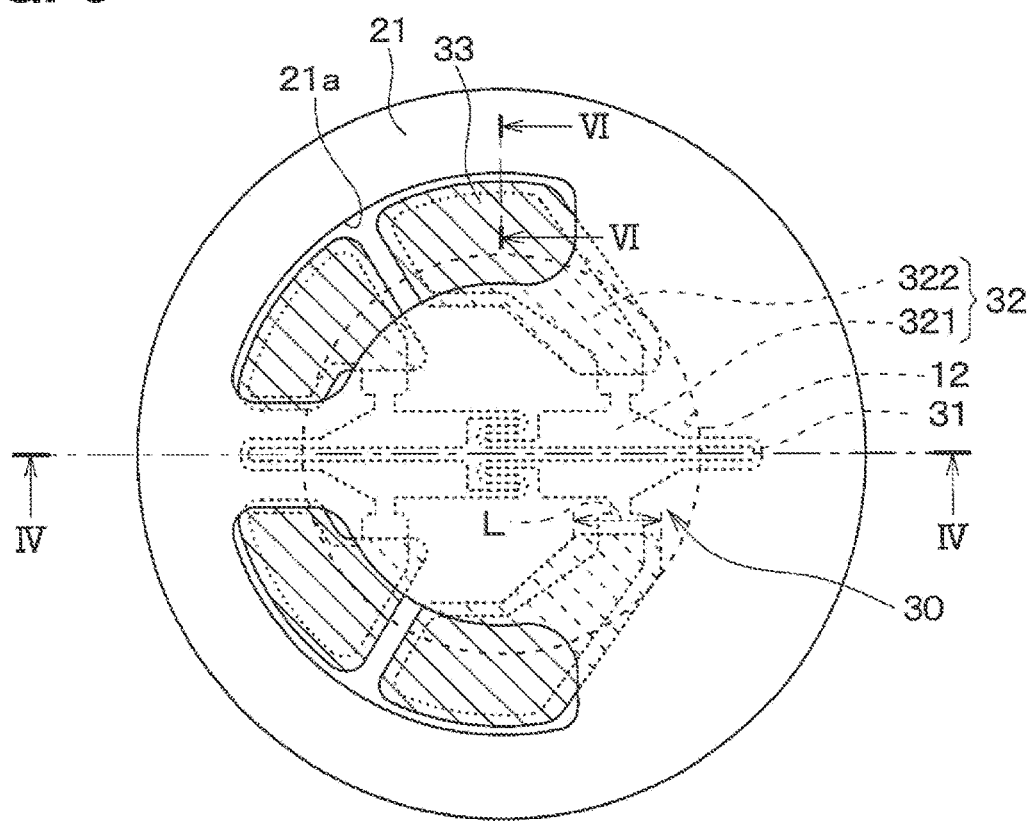
FIG. 5 is a diagram showing a planar shape of a strain detecting element according to a second embodiment.

Further, as shown in FIG. 5, the strain detecting element 30 is connected so that the gauge resistor 31 forms a bridge circuit by the wiring layer 32. Specifically, the wiring layer 32 has a connecting portion 321 and an extending portion 322. The strain detecting element 30 is configured such that adjacent gauge resistors 31 are connected by the connecting portion 321 and the extending portion 322 is pulled out from the connecting portion 321.

Further, the pad portion 33 is configured to have gold as described above, and is formed so as to be connected to each wiring layer 32. In the present embodiment, the pad portion 33 is formed so as to be connected only to the extending portion 322. In other words, the pad portion 33 is formed so as to cover only the extending portion 322. The pad portion 33 is configured to have a narrow width L at the end portion on the connecting portion 321 side so that the pad portion 33 is less likely to be separated from the strain detecting element 30 due to an anchor effect.

The gold constituting the pad portion 33 is a material having higher corrosion resistance than the polysilicon constituting the gauge resistor 31 and the wiring layer 32. Further, FIG. 5 is a plan view in which the protective member 22 is omitted, and is not a cross-sectional view, but the pad portion 33 is hatched for easy understanding. Further, in the similar figures described later, the pad portion 33 is hatched for easy understanding. FIG. 4 is a cross-sectional view taken along the line IV-IV in FIG. 5. However, in FIG. 4, the gauge resistor 31 is exaggerated for easy understanding.

An opening 21a is formed in the protective film 21 so as to expose the pad portion 33. In the present embodiment, two openings 21a are formed, and each opening 21a is formed so as to integrally expose the adjacent pad portions 33. That is, the adjacent pad portions 33 are exposed from the common opening 21a. The bonding wire 52 for electrically connecting to the circuit board 50 is connected to a portion of the pad portion 33 exposed from the opening 21a.

Figure 6:
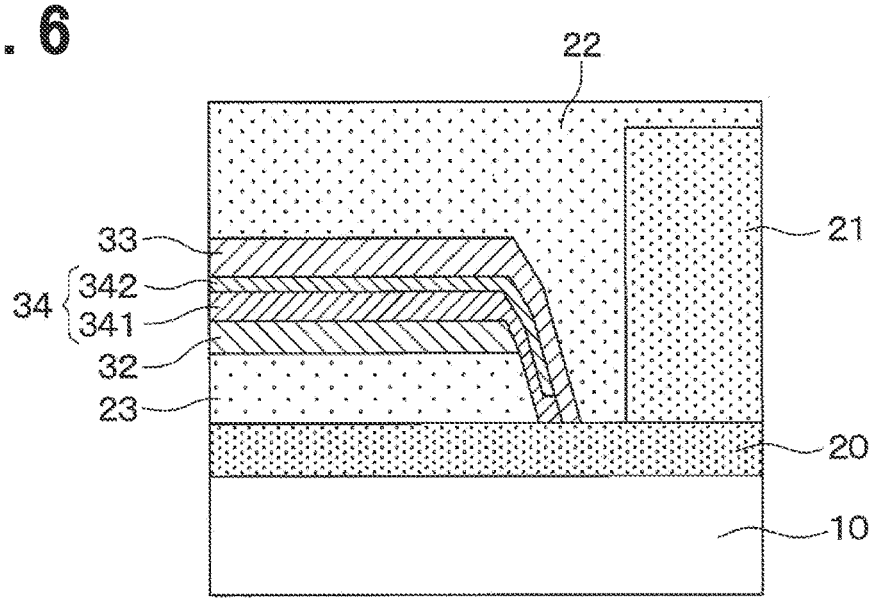
FIG. 6 is a cross-sectional view taken along a line VI-VI shown in FIG. 5.

Further, in the present embodiment, as shown in FIG. 6, a barrier metal 34 formed by laminating a NiCr (nickel chromium) film 341 and a Pd (palladium) film 342 in this order from the wiring layer 32 side is formed between the pad portion 33 and the wiring layer 32. The NiCr film 341 has high corrosion resistance and exhibits a function of protecting the polysilicon constituting the strain detecting element 30. The Pd film 342 exerts a function of suppressing the gold constituting the pad portion 33 from diffusing toward the strain detecting element 30 side. The pad portion 33 is formed so as to cover the wiring layer 32 and the barrier metal 34.

Such the barrier metal 34 and the pad portion 33 are configured as follows. That is, first, a metal mask in which the region where the NiCr film 341 is formed is opened is arranged, and the NiCr film 341 is formed by vapor deposition or the like. Next, the barrier metal 34 is formed by arranging a metal mask in which the region where the Pd film 342 is formed is opened and forming the Pd film 342 by vapor deposition or the like. In this case, since the NiCr film 341 and the Pd film 342 are laminated and arranged in the same region, the manufacturing process can be simplified by using a common metal mask.

Then, when forming the pad portion 33, a metal mask having a larger opening than the metal mask used when forming the NiCr film 341 and the Pd film 342 is used so that the barrier metal 34 is covered. As a result, as described above, the pad portion 33 is formed so as to cover the wiring layer 32 and the barrier metal 34.

As described above, in the present embodiment, the strain detecting element 30 is formed on the low doping layer 23. Therefore, the reliability of the pressure sensor can be improved.

That is, as studied by the present inventors, in a case where the strain detecting element 30 made of polysilicon is directly formed on the insulating film 20, when the polysilicon is deposited, the inventors confirmed that an amorphous layer was formed between the polysilicon and the insulating film 20. Then, in the pressure sensor, it was confirmed that the characteristics of the strain detecting element 30 may change due to the delayed elasticity of the amorphous layer.

Therefore, in the present embodiment, the low doping layer 23 having higher crystallinity than the insulating film 20 is arranged on the insulating film 20, and the strain detecting element 30 is formed on the low doping layer 23. As a result, the amorphous layer formed between the low doping layer 23 and the strain detecting element 30 can be made smaller than the case where the strain detecting element 30 is formed on the insulating film 20. Further, the amorphous layer is formed between the low doping layer 23 and the insulating film 20, but the influence of the delayed elasticity of the amorphous layer is alleviated by the low doping layer 23, and is less likely to be propagated to the strain detecting element 30.

Further, the low doping layer 23 is made of a material having a higher electrical resistivity than the gauge resistor 31. Therefore, an amorphous layer is formed between the low doping layer 23 and the insulating film 20, and even if the low doping layer 23 is affected by the delayed elasticity of the amorphous layer, the influence of the resistance value of the gauge resistor 31 can be reduced. Therefore, it is possible to suppress the change in the characteristics of the strain detecting element 30, and further improve the reliability of the pressure sensor.

Figure 7:
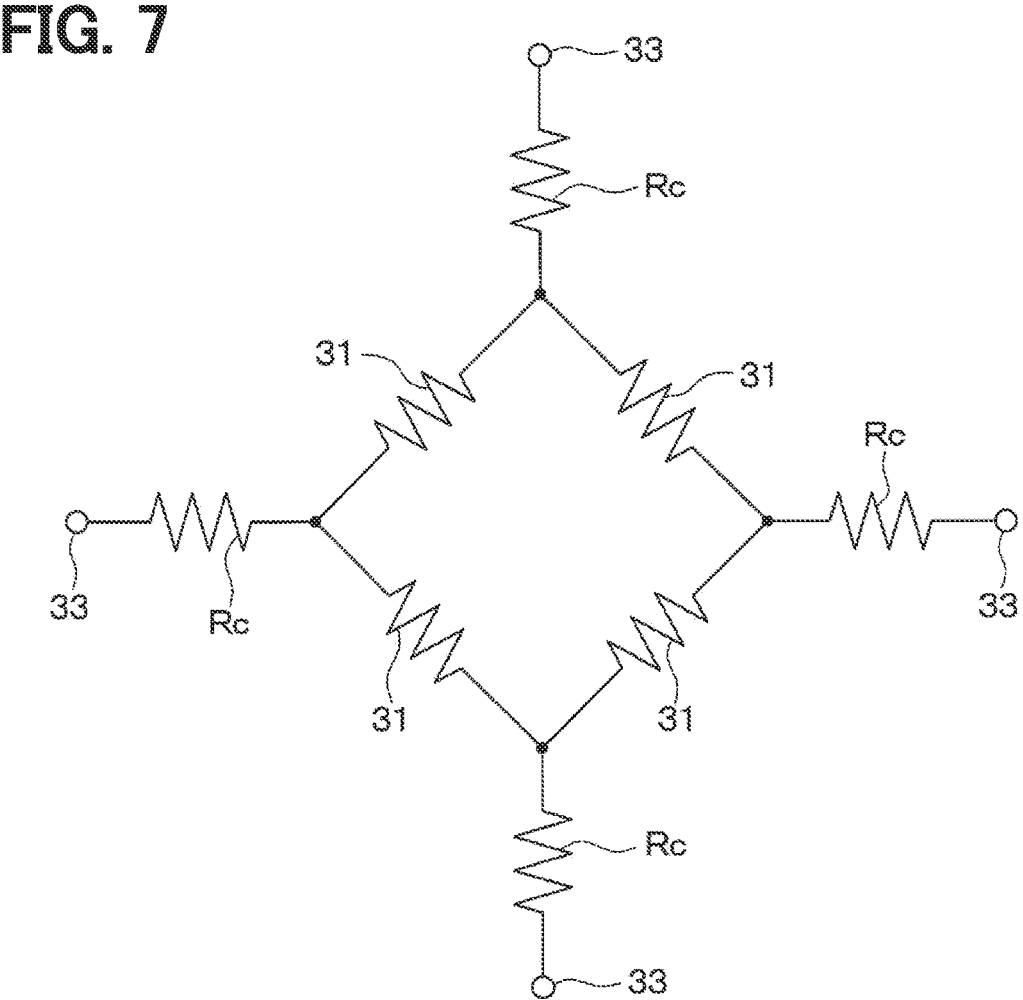
FIG. 7 is a circuit diagram of a strain detecting element according to the second embodiment.

Further, in the wiring layer 32, only the extending portion 322 is connected to the pad portion 33. Therefore, as shown in FIG. 7, the contact resistance Rc between the extending portion 322 and the pad portion 33 is formed on the pad portion 33 side with respect to the connection point of the adjacent gauge resistors 31. As a result, the change in each contact resistor Rc is similarly applied to the adjacent gauge resistors 31. Therefore, in such a pressure sensor, it is possible to suppress a decrease in detection accuracy due to a change in the contact resistance Rc.

Here, the protective member 22 is made of a gel such as a silicone gel as described above. The gel is a material that can permeate moisture. Therefore, in the present embodiment, the pad portion 33 is formed so as to cover the wiring layer 32 and the barrier metal 34. As a result, even if the moisture permeates through the protective member 22, the pad portion 33 can prevent the moisture from reaching the wiring layer 32 (that is, the strain detecting element 30) and the barrier metal 34. Further, the pad portion 33 is made of gold having high corrosion resistance against moisture. Therefore, even if the pad portion 33 is exposed to moisture, the influence is small. Therefore, it is possible to suppress fluctuations in the characteristics of the strain detecting element 30.

(Third Embodiment)

A third embodiment will be described. In the present embodiment, the shape of the opening 21a formed in the protective film 21 is changed from that in the second embodiment. Descriptions of the same configurations and processes as those of the second embodiment will not be repeated hereinafter.

Figure 8:
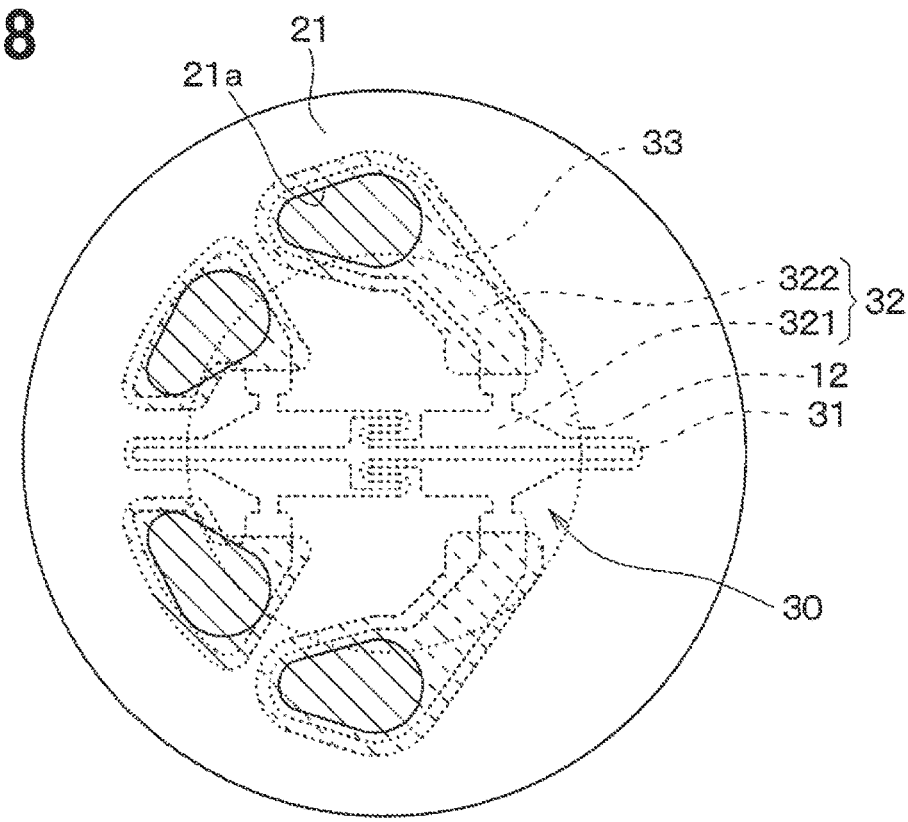
FIG. 8 is a diagram showing a planar shape of the strain detecting element according to a third embodiment.

In the present embodiment, as shown in FIG. 8, the opening 21a formed in the protective film 21 exposes a portion where the pad portion 33 and the wiring layer 32 overlap in a normal direction with respect to a surface direction of the diaphragm 13. Further, the opening 21a is formed so as to expose a portion of the pad portion 33 different from a portion covering the end portion of the extending portion 322 of the pad portion 33. In other words, the opening 21a is formed inside the extending portion 322 without intersecting the end portion of the extending portion 322. That is, the opening 21a is formed so as not to expose a portion where the step is formed on the pad portion 33. In addition, in the normal direction with respect to the surface direction of the diaphragm 13, it is viewed from the normal direction with respect to the surface direction of the diaphragm 13.

According to this configuration, the infiltration of the moisture that has passed through the protective member 22 is suppressed by the pad portion 33. Therefore, it is possible to prevent the moisture from reaching the strain detecting element 30 and the barrier metal 34, and it is possible to prevent the reliability of the pressure sensor from being lowered.

That is, the pad portion 33 is formed by vapor deposition or the like as described above. However, in a case where an aspect ratio, which is a ratio of the height and width of the strain detecting element 30 and the barrier metal 34, is large, it may be difficult to completely cover the strain detecting element 30 and the barrier metal 34. That is, the side surfaces of the strain detecting element 30 and the barrier metal 34 may be exposed from the pad portion 33. In this case, if the opening 21a is formed so as to expose the portion of the pad portion 33 that covers the end portion of the extending portion 322, when the pad portion 33 is not properly formed in the portion, the pad portion 33 may not be properly formed, the moisture that has passed through the protective member 22 may infiltrate from the portion.

On the other hand, in the present embodiment, the opening 21a formed in the protective film 21 is formed to expose the portion different from the covering portion covering the end portion of the extending portion 322 of the pad portion 33 in the portion where the pad portion 33 and the extending portion 322 overlap. That is, the portion where the pad portion 33 is difficult to be formed is not exposed. Therefore, it is possible to prevent the moisture that has passed through the protective member 22 from reaching the strain detecting element 30 and the pad portion 33, and it is possible to prevent the reliability of the pressure sensor from being lowered.

(Modification of Third Embodiment)

Figure 9:
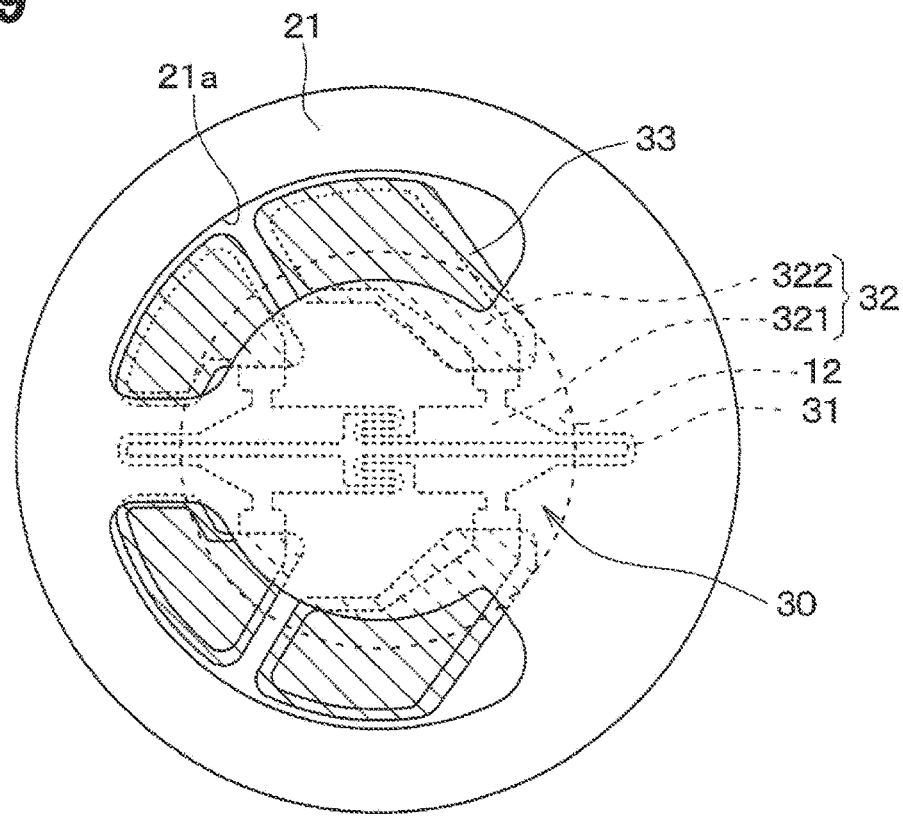
FIG. 9 is a diagram showing a planar shape of a strain detecting element in a modified example of the third embodiment.

A modification of the third embodiment will be described. In the third embodiment, due to wiring restrictions or the like, it may be necessary to form the opening 21a so as to expose the portion of the pad portion 33 that covers the end of the extending portion 322. In this case, it is preferable that the opening 21a is set so that the distance from the portion of the strain detecting element 30 exposed from the pad portion 33 is large. For example, in comparison with FIGS. 5 and 9, a distance between the opening 21a that exposes a portion of the pad portion 33 that covers the end of the extending portion 322 and a portion of the strain detecting element 30 that is exposed from the pad portion 33 is longer in FIG. 5. Therefore, as shown in FIG. 5, it is preferable that the distance between the portion of the strain detecting element 30 exposed from the pad portion 33 and the end portion of the opening 21a is larger.

(Fourth Embodiment)

A fourth embodiment will be described. In the present embodiment, a thin-walled portion is formed on the first stem 101 as compared with the second embodiment. Descriptions of the same configurations and processes as those of the second embodiment will not be repeated hereinafter.

Figure 10:
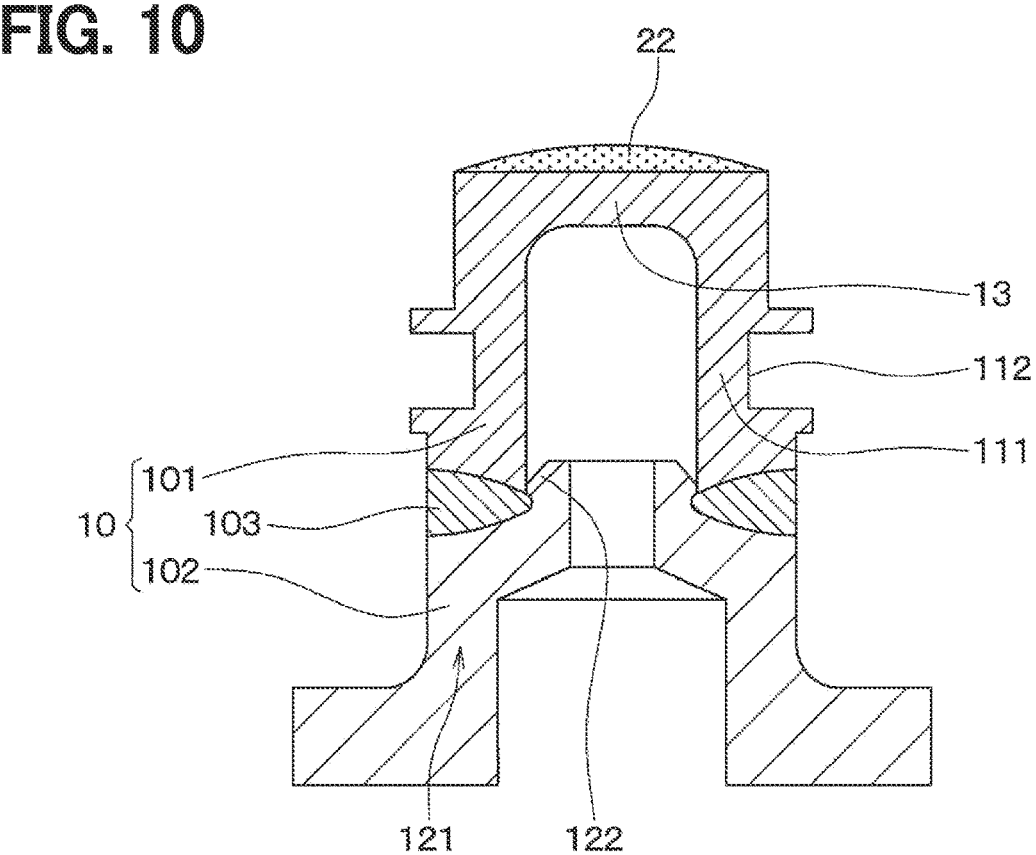
FIG. 10 is a diagram showing a cross-sectional view of the vicinity of the diaphragm in a fourth embodiment.

In the present embodiment, as shown in FIG. 10, the first stem 101 is formed with a thin-walled portion 111 between the welded portion 103 and the diaphragm 13, and the thin-walled portion 111 has a thinner thickness between the inner wall surface and the outer wall surface than the portion where the welded portion 103 is formed. In the present embodiment, the thin-walled portion 111 is configured such that a groove portion 112 is formed so as to go around the outer wall surface.

According to this configuration, since the thin-walled portion 111 is formed on the first stem 101, the reliability of the pressure sensor can be further improved.

That is, in the pressure sensor, after the strain detecting element 30 is formed on the first stem 101, the first stem 101 and the second stem 102 are welded and joined to form the stem 10. In this case, heat is applied when the first stem 101 and the second stem 102 are welded and joined, but this heat is less likely to be propagated to the diaphragm 13 side because the thermal resistance at the thin-walled portion 111 increases. Therefore, it is possible to reduce the influence of heat during welding on the strain detecting element 30 and the pad portion 33 arranged on the diaphragm 13. In particular, since the gold constituting the pad portion 33 is easily diffused by heat, it is possible to suppress the diffusion of gold. Therefore, the reliability of the pressure sensor can be further improved.

(Modification of Fourth Embodiment)

In the fourth embodiment, the groove portion 112 may not be formed so as to go around the outer wall surface of the first stem 101. Further, the groove portion 112 may be formed on the inner wall surface instead of the outer wall surface. Even if the groove portion 112 is formed in this way, the thin-walled portion 111 is formed in the portion between the welded portion 103 and the diaphragm 13 in the first stem 101, so that the same effect as that of the fourth embodiment can be obtained.

(Fifth Embodiment)

A fifth embodiment will be described. The present embodiment is a modification of the configuration of the circuit board 50 with respect to the first embodiment. Descriptions of the same configurations and processes as those of the first embodiment will not be repeated hereinafter.

Figure 11:
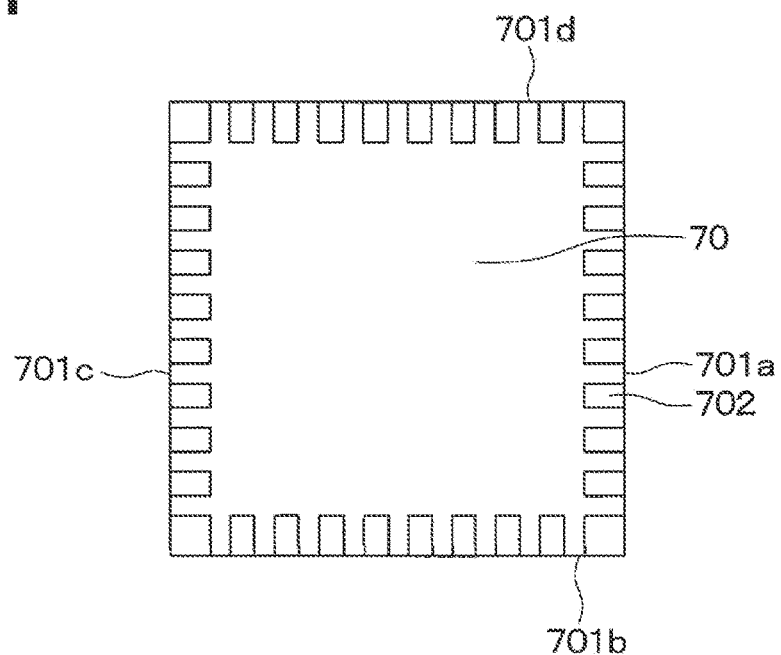
FIG. 11 is a diagram showing a configuration of an electronic component according to a fifth embodiment.

First, the configuration of an electronic component 70 of the present embodiment will be described. The electronic component 70 is a QFN, and a circuit chip on which an amplifier circuit, a correction circuit, and the like are formed is housed in a case. Then, as shown in FIG. 11, the electronic component 70 has two sets of opposite sides 701a to 701d, and has a planar rectangular shape in which the sides 701a to 701d of each set are orthogonal to each other, and has a configuration in which a plurality of electrode portions 702 are provided on each side. FIG. 11 is a plan view showing a side of the electronic component 70 facing the circuit board 50. Further, in FIG. 11, the electronic component 70 has a rectangular shape in a plane, but the electronic component 70 may have a substantially rectangular shape in a plane, and may have a rounded shape with chamfered corners.

Figure 12:
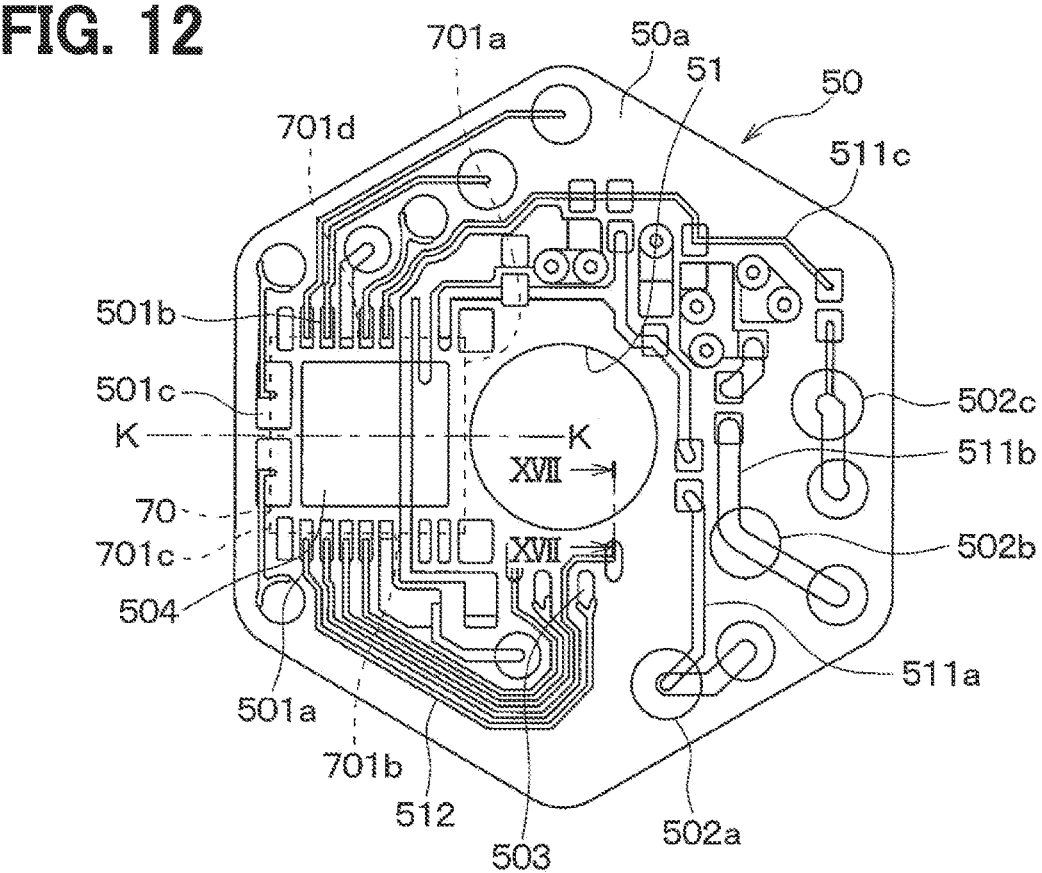
FIG. 12 is a plan view showing a configuration on a surface side of a circuit board according to the fifth embodiment.

Then, as shown in FIG. 12, the electronic component 70 is arranged so that a virtual line K connecting a center of the through hole 51 and an outer edge of the circuit board 50, and a center of the two sides 701a and 701c of the two pairs of opposite sides 701a to 701d intersect. In other words, the electronic component 70 is arranged in a state in which the virtual line K and the two sides 701a and 701c of the two pairs of opposite sides 701a to 701d are orthogonal to each other. More specifically, the circuit board 50 has a hexagonal outer shape. The electronic component 70 is arranged so that one side 701c facing the outer edge of the circuit board 50 is parallel to one side of the outer edge of the circuit board 50 when viewed from the normal direction with respect to the surface direction of the circuit board 50.

On the circuit board 50, electrode portion lands 501a and 501b are formed at positions facing the electrode portions 702 formed on the two sides 701b and 701d intersecting one side 701a on the through hole 51 side of the electronic component 70. Further, on the circuit board 50, an electrode portion land 501c is formed at a position facing the electrode portion 702 formed on the one side 701c facing the one side 701a on the through hole 51 side of the electronic component 70. In the following, the electrode portion lands 501a and 501b at positions facing the electrode portions 702 formed on the two sides 701b and 701d intersecting the one side 701a on the through hole 51 side of the electronic component 70 are referred to as the side lands 501a and 501b. Further, the electrode portion 501b at a position facing the electrode portion 702 formed on the one side 701c facing the one side 701a on the through hole 51 side of the electronic component 70 is also referred to as a facing land 501c.

In the present embodiment, the circuit board 50 is not formed with the electrode portion land 501c at a position facing the electrode portion 702 formed on one side 701a on the through hole 51 side of the electronic component 70. Further, as described above, the circuit board 50 is also formed with external connection lands 502a to 502c connected to the terminal member 85 at positions facing the terminal member 85. In the present embodiment, the external connection land 502 has a power supply land 502a to which a power supply voltage is applied, a ground land 502b connected to the ground, and an output land 502c to which a detection result is output. Further, the circuit board 50 is also formed with an element land 503 electrically connected to the strain detecting element 30 in a portion on the through hole 51 side. Further, the circuit board 50 is also formed with a ground pattern 504 that is maintained at a predetermined potential at a position facing the electronic component 70 and suppresses the potential fluctuation of the electronic component 70. Further, wiring patterns 511a to 511c and 512 for connecting predetermined locations are also connected on the circuit board 50. The circuit board 50 is formed with a protective layer such as a resist that protects the wiring patterns 511a to 511c, 512 and the like. The protective layer is appropriately formed with openings at a portion to which the bonding wire 52 is connected and a portion to be connected to the terminal member 85. In FIG. 12, this protective layer is omitted.

Here, the electronic component 70 is fixed to the electrode portion lands 501a to 501c via a solder 71 as described above. Then, a solder paste constituting the solder 71 is arranged by screen printing using a metal mask having a predetermined area opened. In this case, the electrode portion lands 501a to 501c are preferably enlarged so that the opening of the metal mask can be made larger than a predetermined area in order to improve the solder removal property during screen printing.

Figure 13:
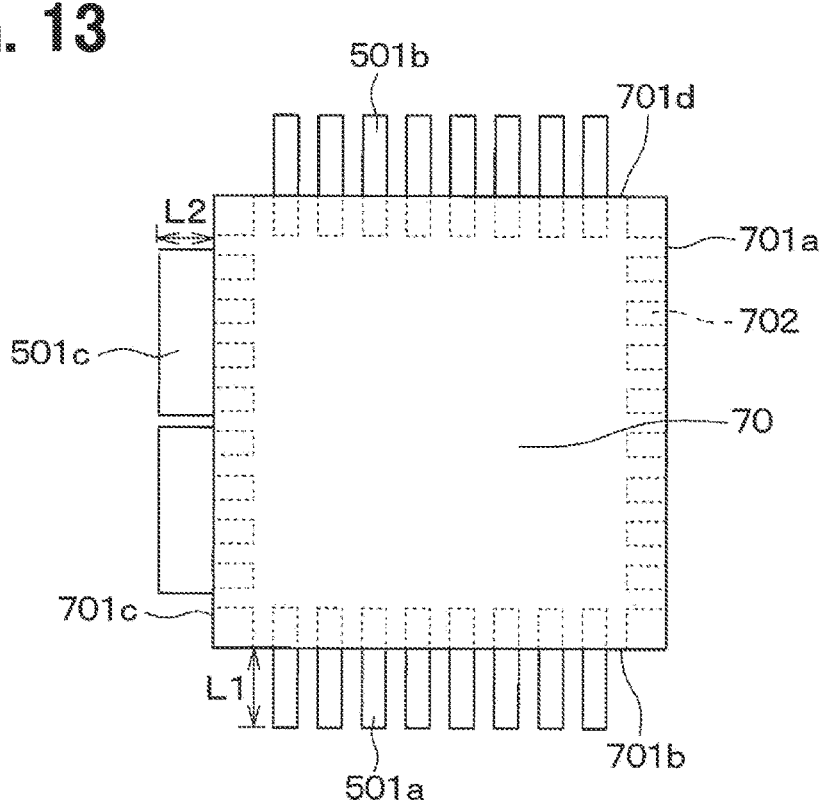
FIG. 13 is a plan view showing a relationship between an electronic component and a land for an electrode portion.

Therefore, in the present embodiment, as shown in FIG. 13, the side lands 501a and 501b have a protrusion length L1 from the electronic component 70 so that the solder removal property can be improved in the normal direction with respect to the surface direction of the circuit board 50. However, as shown in FIG. 12, the facing lands 501c are arranged on the outer edge side of the circuit board 50, and similarly to the side lands 501a and 501b, if the protrusion length L2 from the electronic component 70 is lengthened, the size of the circuit board 50 becomes large. The protrusion length L1 is a length in a direction orthogonal to one sides 701b and 701c facing the side lands 501a and 501b of the electronic component 70. The protrusion length L2 is a length in a direction orthogonal to one side 701c facing the facing land 501c of the electronic component 70.

Therefore, in the present embodiment, the facing land 501c has the protrusion length L2 shorter than the protrusion length L1. However, in this case, simply shortening the protrusion length L2 reduces the area of the facing land 501c, so that the size of the opening of the metal mask corresponding to the facing land 501c also becomes smaller. Therefore, when the protrusion length L2 of the facing land 501c is shortened, there is a concern that a solderability may be deteriorated.

Therefore, in the present embodiment, a plurality of electrode portions 702 formed on one side 701c of the electronic component 70 are further connected to a common facing land 501c. That is, the facing land 501c is configured by connecting a plurality of adjacent electrode portion land. In other words, the plurality of electrode portions 702 formed on one side 701c of the electronic component 70 face the common facing land 501c. In the present embodiment, two facing lands 501c are formed. Each of the facing lands 501c is connected to four electrode portions 702 formed on one side 701c of the electronic component 70, respectively.

The electronic component 70 is in a state in which the circuit chip inside the case is electrically connected to the predetermined electrode portion 702. Therefore, the electrode portion 702 connected to the common facing land 501c is in a state in which a portion of the circuit chip having the same potential is connected or is not connected to the circuit chip.

As described above, the facing land 501c has the protrusion length L2 shorter than the protrusion length L1. Therefore, the size of the circuit board 50 can be reduced as compared with the case where the protrusion length L2 is the same as the protrusion length L1.

Further, the facing land 501c is configured by connecting a plurality of adjacent electrode portion land. Therefore, the area of the facing land 501c can be increased, and the deterioration of the solderability can be suppressed. Therefore, it is possible to suppress the occurrence of poor connection between the electronic component 70 and the circuit board 50, and it is possible to improve the reliability of the pressure sensor.

Figure 14A:
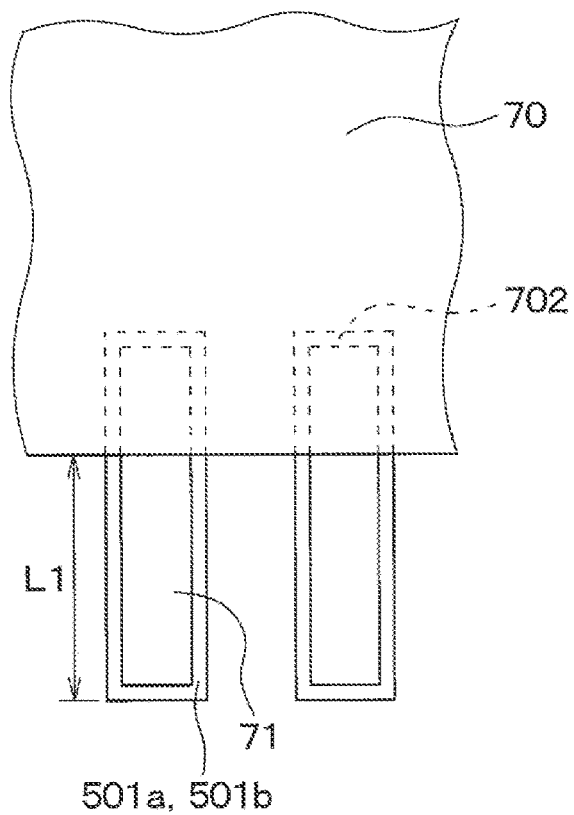
FIG. 14A is a plan view showing a relationship between a size of the electrode portion and a size of a side land.

That is, as shown in FIG. 14A, the side lands 501a and 501b have the protrusion length L1 set so as to improve the solderability. Then, the solder 71 is arranged according to the sizes of the side lands 501a and 501b. Therefore, the opening of the metal mask when arranging the solder paste can be enlarged.

Figure 14B:
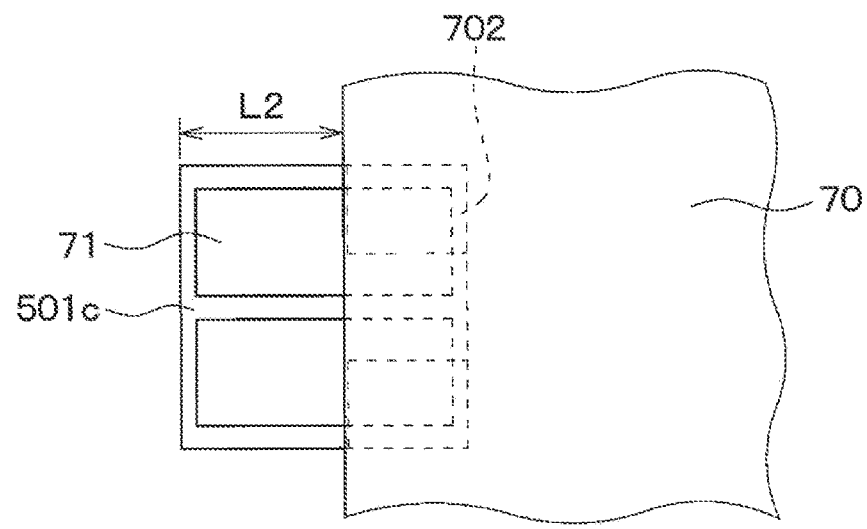
FIG. 14B is a plan view showing the relationship between a size of the electrode portion and a size of a facing land.

On the other hand, as shown in FIG. 14B, the facing land 501c has the protrusion length L2 shorter than the protrusion length L1. For this reason, the facing land 501c connect the adjacent electrode portion lands so that the solder 71 can be spread in the arrangement direction of the electrode portions 702. That is, the opening of the metal mask when arranging the solder paste can be enlarged. Therefore, it is possible to suppress the deterioration of the solderability, and it is possible to suppress the occurrence of poor connection between the electronic component 70 and the circuit board 50. FIG. 14B shows a state in which the two electrode portions 702 are connected to the common facing land 501c.

Further, in the present embodiment, on the circuit board 50, the electrode portion land is not formed at a position facing the electrode portion 702 formed on one side 701a on the through hole 51 side. Therefore, the electronic component 70 can be arranged close to the through hole 51, and the circuit board 50 can be miniaturized.

In the present embodiment, since the electronic component 70 is arranged on the circuit board 50 as described above, the three regions of the electronic component 70 are connected to the electrode portion lands 501a to 501c. In this case, if the amount of solder 71 between the facing land 501c and the electrode portion 702 is increased too much, there is a concern that the electronic component 70 may be tilted with respect to the circuit board 50. Therefore, it is preferable that the amount (that is, the thickness) of the solder 71 arranged on the facing land 501 is adjusted so that the electronic component 70 does not tilt.

(Sixth Embodiment)

A sixth embodiment will be described hereafter. The present embodiment is a modification of the configuration of the circuit board 50 with respect to the fifth embodiment. Descriptions of the same configurations and processes as those of the fifth embodiment will not be repeated hereinafter.

Figure 15:
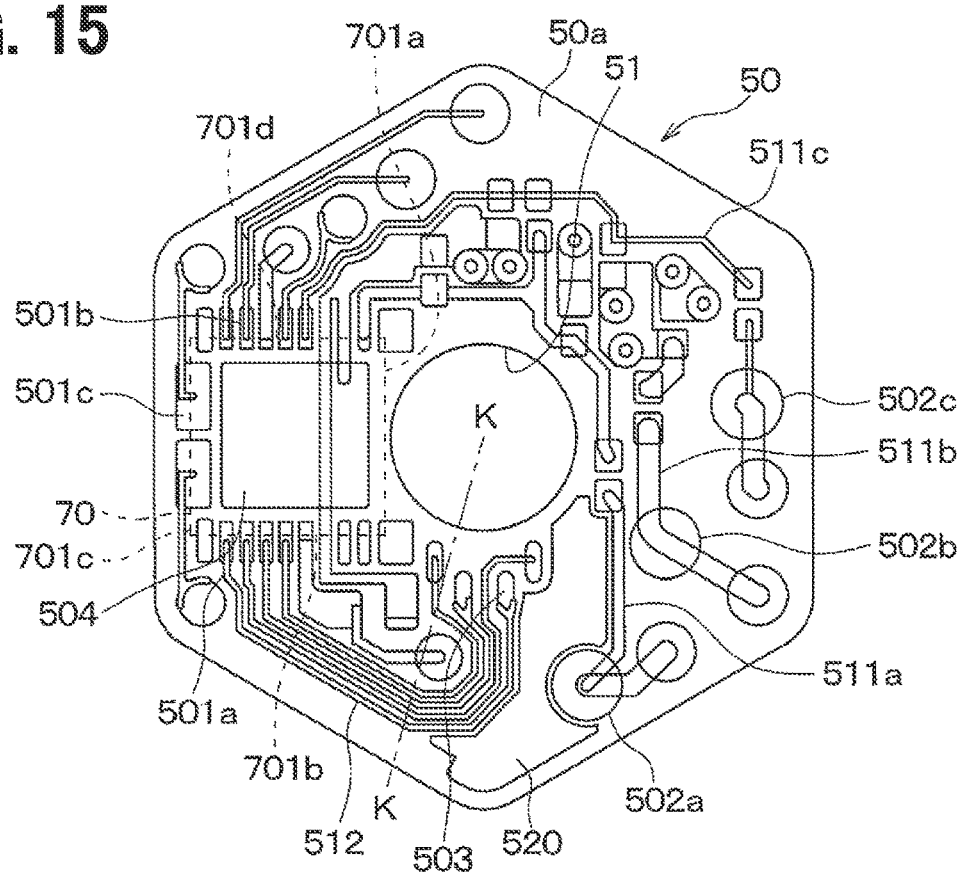
FIG. 15 is a plan view showing a configuration of the surface side of the circuit board in a sixth embodiment.

In the present embodiment, as shown in FIG. 15, the external connection lands 502a to 502c and the electrode portion land 501b are connected via the external connection patterns 511a to 511c. The element land 503 and the electrode portion land 501a are connected via a sensing pattern 512. The external connection patterns 511a to 511c and the sensing pattern 512 are formed in different regions.

Specifically, the external connection patterns 511a to 511c and the sensing pattern 512 are formed so as to intersect different virtual lines K with respect to the virtual line K connecting the center of the through hole 51 and the outer edge of the circuit board 50. In other words, the external connection patterns 511a to 511c and the sensing pattern 512 are formed so as not to intersect the same virtual line K. For example, the virtual line K in FIG. 15 intersects only the sensing pattern 512.

Then, on the circuit board 50, a guard pattern 520 maintained at a predetermined potential is formed between the power supply pattern 511a connecting the power supply land 502a and the electrode portion land 501a and the sensing pattern 512.

Figure 16:
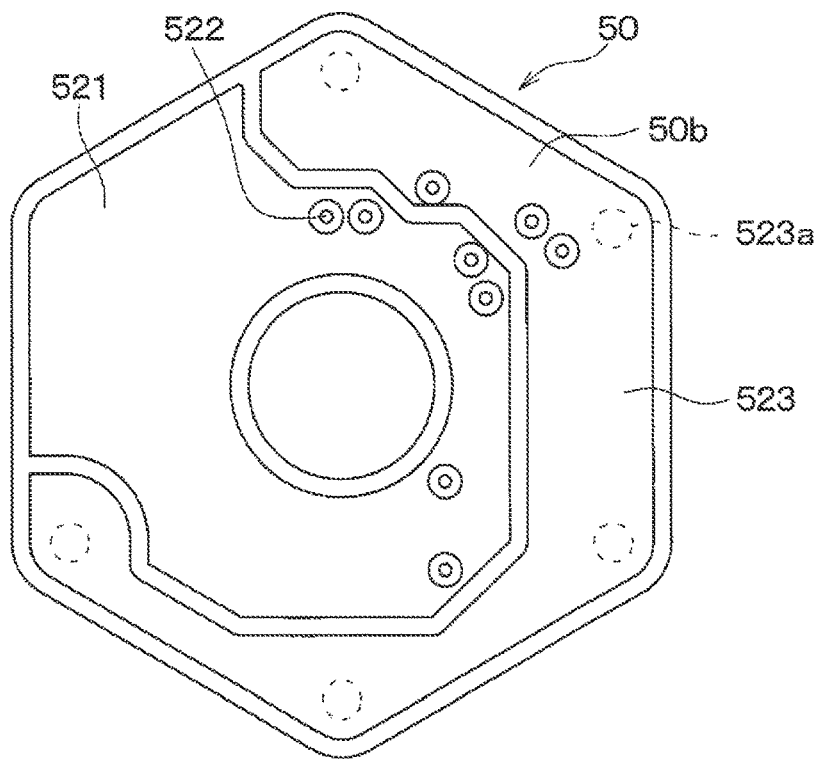
FIG. 16 is a plan view showing a configuration on a back surface side of the circuit board according to the sixth embodiment.

In the present embodiment, the guard pattern 520 is maintained at the ground potential. Specifically, as shown in FIG. 16, the circuit board 50 is formed with a guard pattern 521 on the back surface 50b side as well as a plurality of through-hole electrodes 522. The guard pattern 521 on the back surface 50b side is connected to the ground pattern 511b connected to the ground land 502b through the through-hole electrode 522, and is maintained at the ground potential. Then, the guard pattern 520 on the front surface 50a side is maintained at the ground potential by being connected to the guard pattern 521 on the back surface 50b side through the through-hole electrode 522.

Further, in the present embodiment, the circuit board 50 is formed with a ground pattern 523 for a body ground on the back surface 50b side. Further, in the present embodiment, a joining portion 60 arranged between the mounting portion 42 of the housing 40 and the circuit board 50 uses a conductive adhesive. Then, in the circuit board 50, the ground pattern 523 is configured as the body ground by electrically connecting the connection portion 523a to the housing 40 via the joining member 60.

According to this configuration, the external connection patterns 511a to 511c and the sensing pattern 512 are formed in different regions. Since the external connection patterns 511a to 511c are connected to the external circuit via the terminal member 85, noise is likely to be applied. Therefore, it is possible to suppress the propagation of noise from the external connection patterns 511a to 511c to the sensing pattern 512 as compared with the case where the external connection patterns 511a to 511c and the sensing pattern 512 are formed in the same region (that is, close to each other).

Further, in the external connection patterns 511a to 511c, noise is particularly likely to be applied to the power supply pattern 511a. Then, in the present embodiment, the guard pattern 520 maintained at a predetermined potential is formed between the power supply pattern 511a and the sensing pattern 512. Therefore, even if noise is applied to the power supply pattern 511a, it is possible to suppress the noise from being coupled to the sensing pattern 512. Therefore, it is possible to suppress a decrease in detection accuracy and improve the reliability of the pressure sensor.

(Seventh Embodiment)

A seventh embodiment will be described. The present embodiment is a modification of the configuration of the circuit board 50 with respect to the fifth embodiment. Descriptions of the same configurations and processes as those of the fifth embodiment will not be repeated hereinafter.

Figure 17:
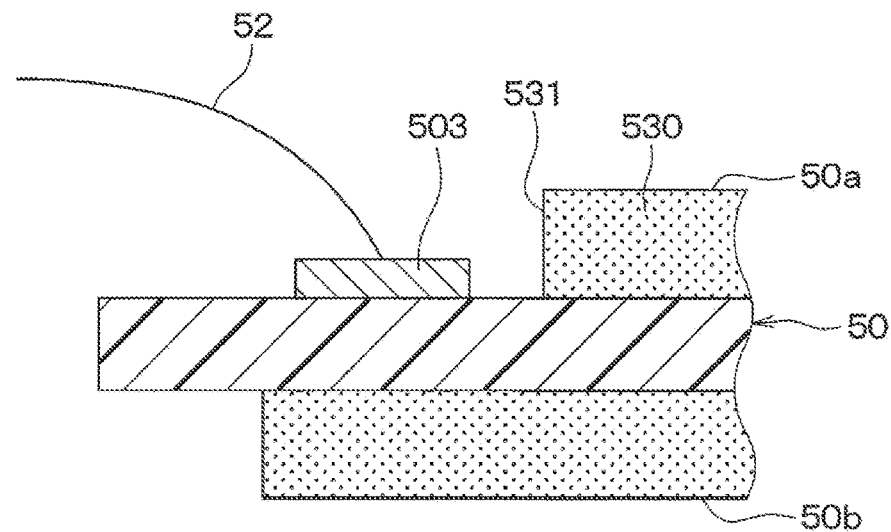
FIG. 17 is a cross-sectional view showing a damming structure according to a seventh embodiment.

As described above, the circuit board 50 is formed with the protective layer such as a resist, and the protective layer is appropriately provided with openings at a portion to which the bonding wire 52 is connected and a portion to be connected to the terminal member 85. Then, in the present embodiment, as shown in FIG. 17, an opening 531 is formed in the protective layer 530 so as to reach the through hole 51 while exposing entirely the element land 503. Further, on the back surface 50b side of the circuit board 50, a portion of the protective layer 530 located at the end on the through hole 51 side is removed. In this embodiment, the opening 531 corresponds to a damming structure. Further, FIG. 17 corresponds to a cross-sectional view taken along the line XVII-XVII in FIG. 12.

According to this configuration, the protective layer 530 is formed with the opening 531 so as to reach the through hole 51 while exposing entirely the element land 503. Therefore, the reliability of the pressure sensor can be improved.

That is, the strain detecting element 30 and the element land 503 are electrically connected via the bonding wire 52. Further, as shown in FIG. 2, the protective member 22 made of a gel such as a silicone gel is arranged on the strain detecting element 30. In this case, the protective member 22 may bleed onto the circuit board 50 along the bonding wire 52. Then, when the protective member 22 bleeds onto the circuit board 50 and reaches between the terminal member 85 and the external connection lands 502a to 502c, there is a possibility that a poor connection between the terminal member 85 and the external connection lands 502a to 502c occurs.

Therefore, in the present embodiment, the protective layer 530 is formed with the opening 531 so as to reach the through hole 51 while exposing entirely the element land 503. As a result, when the protective member 22 bleeds to the element land 503 side, the area for accumulating the protective member 22 can be increased as compared with the case where the protective layer 530 is formed with the opening 531 in which only a part of the element land 503 is opened. Further, when the protective member 22 bleeds to the element land 503 side, the protective member 22 can be flowed to the back surface 50b side of the circuit board 50 through the through hole 51. Therefore, it is possible to prevent the protective member 22 from reaching the external connection lands 502a to 502c, and it is possible to suppress the occurrence of poor connection between the terminal member 85 and the external connection lands 502a to 502c. Therefore, the reliability of the pressure sensor can be improved.

(Eighth Embodiment)

An eighth embodiment will be described. The present embodiment is a modification of the configuration of the circuit board 50 with respect to the seventh embodiment. Descriptions of the same configurations and processes as those of the seventh embodiment will not be repeated hereinafter.

Figure 18:
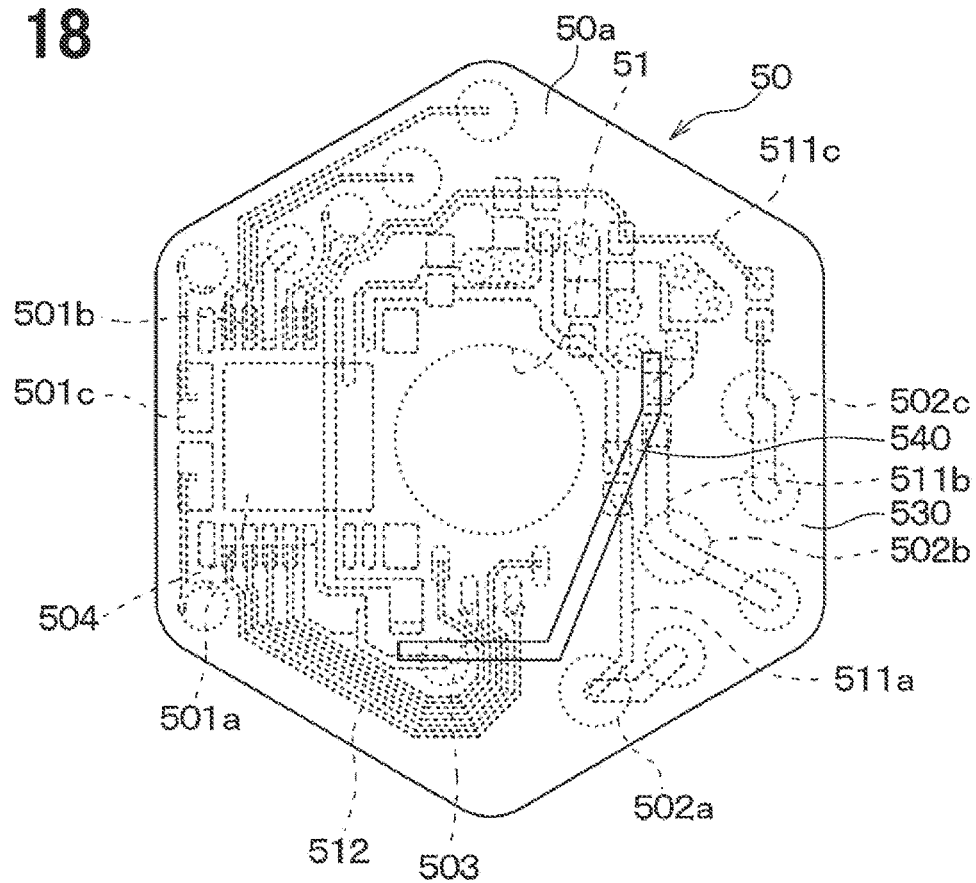
FIG. 18 is a plan view showing a damming structure according to an eighth embodiment.

In the present embodiment, as shown in FIG. 18, a dam portion 540 is formed between the element land 503 connected to the strain detecting element 30 and the external connection lands 502a to 502c. Specifically, the dam portion 540 is constructed by forming an uneven structure on the protective layer 530. That is, the dam portion 540 is configured, for example, by forming a recess in the protective layer 530 that is recessed from the periphery. Further, the dam portion 540 is configured by forming, for example, a convex portion protruding from the periphery.

In the present embodiment, the dam portion 540 corresponds to a damming structure. Further, FIG. 18 shows a state in which the protective layer 530 is arranged on the circuit board 50. However, the openings for exposing the element lands 503 and the external connection lands 502a to 502c formed on the protective layer 530 are omitted.

In this way, the dam portion 540 may be formed between the element land 503 and the external connection lands 502a to 502c. Even with such a configuration, when the protective member 22 bleeds to the element land 503 side, the dam portion 540 can prevent the protective member 22 from reaching the external connection lands 502a to 502c. Therefore, the same effect as that of the seventh embodiment can be obtained.

A plurality of dam portions 540 may be formed between the element land 503 and the external connection lands 502a to 502c.

(Ninth Embodiment)

A ninth embodiment will be described. In the present embodiment, the shape of the housing 40 is changed from that of the first embodiment. Descriptions of the same configurations and processes as those of the first embodiment will not be repeated hereinafter.

Figure 19:
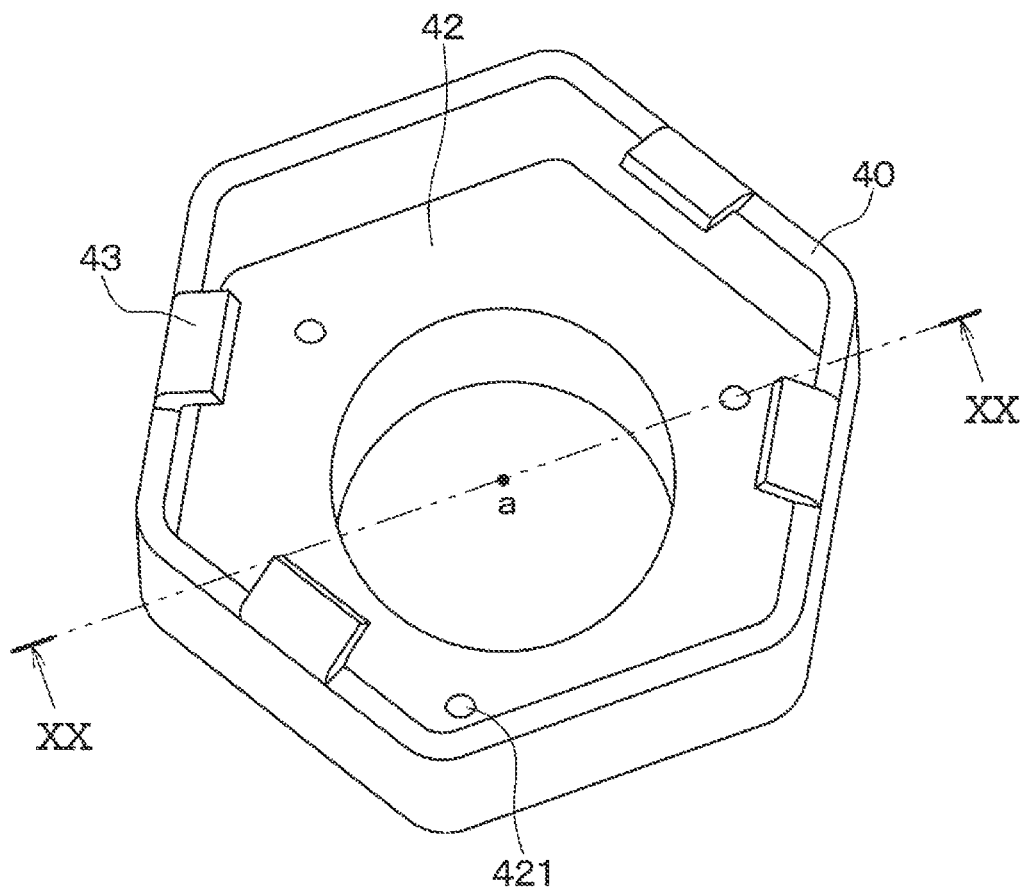
FIG. 19 is a perspective view of a housing according to a ninth embodiment.

In the present embodiment, as shown in FIG. 19, the housing 40 is formed with a height projection 421 as a convex portion on the mounting portion 42. Specifically, the height projections 421 are formed at three locations. Further, the housing 40 has a tubular shape having a hollow portion having a central axis a in one direction. Each of the height projections 421 is formed at equal intervals in the circumferential direction about the central axis a, and has the same height. Each of the height projections 421 is formed by press molding or the like when the housing 40 is prepared. That is, each height projection is formed using the same processing device.

Figure 20:
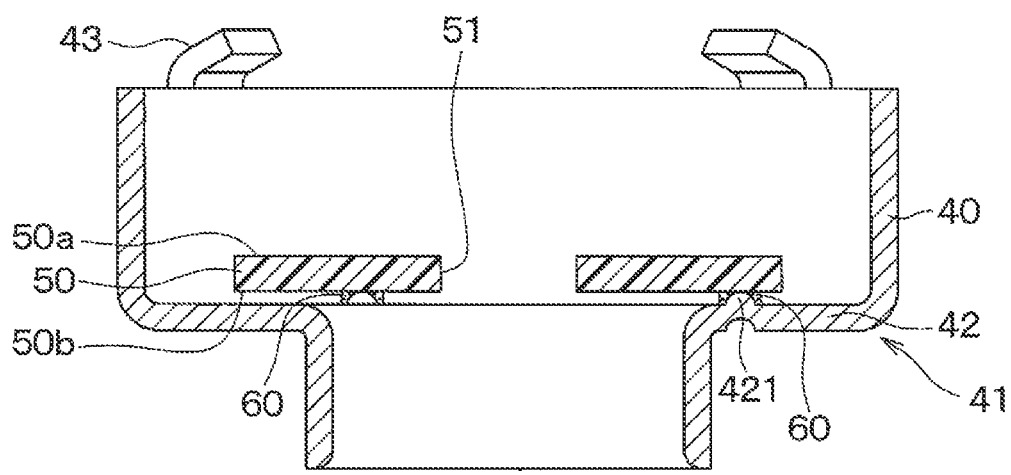
FIG. 20 is a cross-sectional view taken along the line XX-XX in FIG. 19.

Then, as shown in FIG. 20, the circuit board 50 is arranged so as to be in contact with each height projection 421. That is, the circuit board 50 is arranged in contact with the height projections formed at equal intervals in the circumferential direction at three locations. A joining member 60 is arranged between the circuit board 50 and the mounting portion 42.

In the present embodiment, the circuit board 50 is arranged so that the center of the through hole 51 and the central axis a of the housing 40 coincide with each other. Therefore, the portions of the circuit board 50 that come into contact with the height projections 421 are located at equal intervals in the circumferential direction with the through hole 51 as the center. Further, FIG. 20 shows the housing 40 and the circuit board 50, and the configuration of the stem 10 and the like are omitted.

Further, in the present embodiment, although not particularly shown, one of the height projections 421 is formed so as to be located on the opposite side of the terminal member 85 with the circuit board 50 interposed therebetween.

According to this configuration, the circuit board 50 is in contact with each height projection 421 at three points. Further, each of the height projections 421 is formed at equal intervals in the circumferential direction, and have the same height. Therefore, it is possible to prevent the circuit board 50 from tilting with respect to the mounting portion 42. Therefore, it is possible to suppress the occurrence of poor connection between the terminal member 85 and the circuit board 50, and it is possible to improve the reliability of the pressure sensor.

Further, the distance between the mounting portion 42 and the circuit board 50 is defined by the height of the height projection 421. Therefore, the distance between the mounting portion 42 and the circuit board 50 can be set as a desired distance. That is, a joining member 60 having a desired thickness can be arranged between the mounting portion 42 and the circuit board 50. Therefore, the joining member 60 can exert a desired stress relaxation function, and the stress propagated from the housing 40 to the circuit board 50 can be reduced.

By the way, it is conceivable to secure a space between the circuit board 50 and the mounting portion 42 by arranging a spacer or the like prepared separately from the housing 40 between the circuit board 50 and the mounting portion 42. However, in this configuration, since spacer is separately formed, it is assumed that the height of each spacer varies. In addition, the number of parts is increased by preparing spacers.

On the other hand, in the present embodiment, each of the height projections 421 is formed on the housing 40 by using the same processing device, and it is suppressed that the heights are different. Therefore, in the present embodiment, it is possible to reduce the number of parts while suppressing the circuit board 50 from tilting with respect to the mounting portion 42, as compared with the case where the space between the circuit board 50 and the mounting portion 42 is secured by arranging a spacer or the like prepared separately from the housing 40.

Further, when the spacer is made of a material different from that of the housing 40, there is a concern that cracks may occur in the spacer due to the difference in the coefficient of thermal expansion from the housing 40. However, in the present embodiment, since each height projection 421 is composed of a part of the housing 40, it is possible to suppress the introduction of cracks into the height projection 421 due to the difference in the coefficient of thermal expansion.

Further, in the present embodiment, one of the height projections 421 is formed so as to be located on the opposite side of the terminal member 85 with the circuit board 50 interposed therebetween. Therefore, since the pressing force of the terminal member 85 can be supported by the height projection 421, the tilting of the circuit board 50 can be further suppressed.

(Modification of Ninth Embodiment)

A modification of the ninth embodiment will be described. In the ninth embodiment, the height projections 421 may be formed at four or more locations at equal intervals in the circumferential direction about the central axis a. However, even if the height projections 421 are formed at four or more locations, the circuit board 50 is in principle in contact with each height projection 421 at three locations.

Further, in the ninth embodiment, the height projection 421 may not be formed so as to be located on the opposite side of the terminal member 85 with the circuit board 50 interposed therebetween.

(Tenth Embodiment)

A tenth embodiment will be described. In the present embodiment, the shape of the housing 40 is changed from that of the ninth embodiment. Descriptions of the same configurations and processes as those of the ninth embodiment will not be repeated hereinafter.

Figure 21:
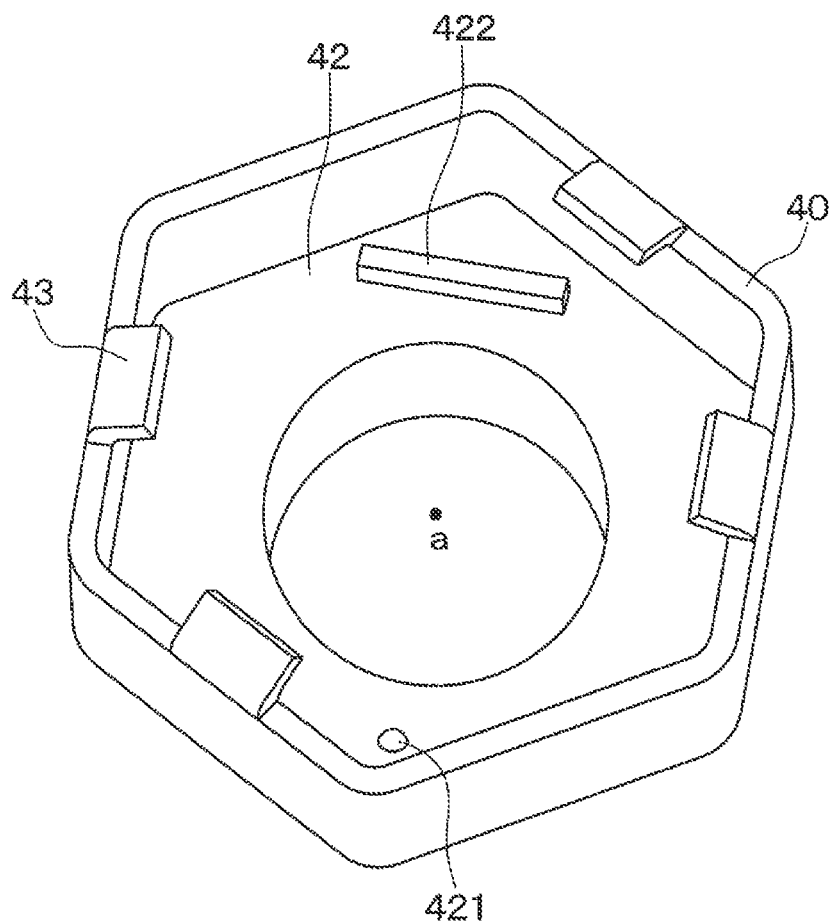
FIG. 21 is a perspective view of a housing according to a tenth embodiment.

In the present embodiment, as shown in FIG. 21, the housing 40 is formed with one height projection 421 and one side portion 422 having a predetermined length on the mounting portion 42. Specifically, the height projection 421 and the side portion 422 are centered on the central axis a, and the lengths in the circumferential direction between the height projection 421 and each end of the side portion 422 are evenly spaced. Further, the heights of the height projection 421 and the side portion 422 are the same. The side portion 422 has, for example, a length of about ½ with respect to one side of the hexagonal shape constituting the outer shape of the housing 40. Further, in the present embodiment, the height projection 421 and the side portion 422 correspond to the convex portion.

The circuit board 50 is arranged so as to come into contact with the height projection 421 and the side portion 422. Therefore, the circuit board 50 is in contact with the height projection 421 and the side portion 422. Then, the side portion 422 is in contact with the circuit board 50 over a predetermined length.

In this way, even if one height projection 421 and one side portion 422 are formed on the housing 40 so as to come into contact with the circuit board 50 at two locations, the same effect as that of the ninth embodiment can be obtained.

(Modification of Ninth and Tenth Embodiments)

A modification of the tenth embodiment will be described. In the tenth embodiment, the two side portions 422 may be provided without forming the height projection 421. In this case, the two side portions 422 may be formed so that the lengths in the circumferential direction between the ends are evenly spaced. Even with such a configuration, since the circuit board 50 comes into contact with the side portion 422 at two locations, the same effect as that of the ninth embodiments can be obtained.

Further, in the ninth embodiment, if the circuit board 50 comes into contact with the height projections 421 at three locations, the side portions 422 may be formed on the housing 40. For example, the housing 40 may be formed with three side portions 422. In this case, each side portion 422 may be formed in such manner that the distance between the edges of the side portions 422 is formed at equal intervals in the circumferential direction with the central axis a as the center. Further, for example, the housing 40 may be formed with one height projection 421 and two side portions 422. In this case, in the one height projection 421 and the two side portions 422, the distance between the height projection 421 and the ends of each side portion 422 is formed at equal intervals in the circumferential direction with the central axis a as the center.

(Eleventh Embodiment)

An eleventh embodiment will be described. The present embodiment is a modification of the configuration of the housing 40 with respect to the ninth embodiment. Descriptions of the same configurations and processes as those of the ninth embodiment will not be repeated hereinafter.

Figure 22:
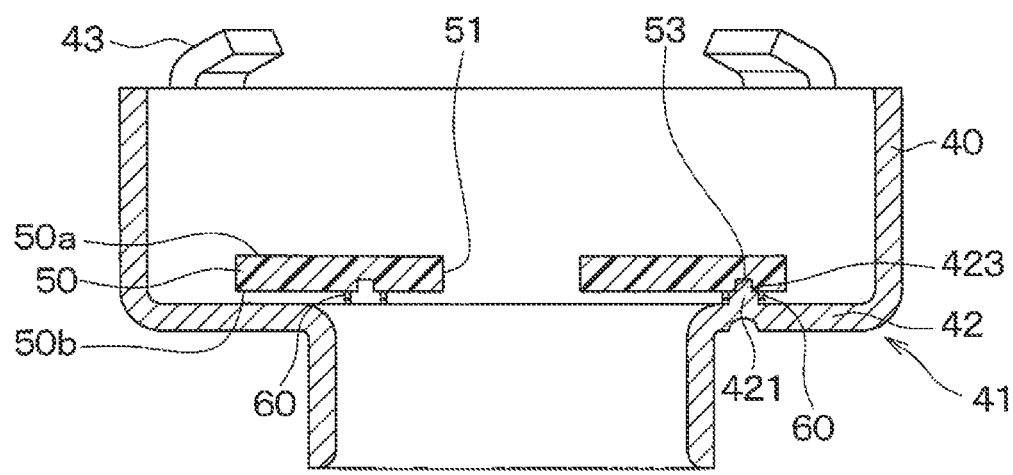
FIG. 22 is a cross-sectional view of a housing and a circuit board according to an eleventh embodiment.

In the present embodiment, as shown in FIG. 22, the housing 40 is formed with a height projection 421 and an alignment projection 423. In the present embodiment, the alignment projection 423 is formed on the height projection 421, and the length of the outer wall surface of the alignment projection 421 is shorter than that of the height projection 421.

The circuit board 50 is formed with a recess 53 into which the alignment projection 423 is inserted at a position corresponding to the alignment projection 423. The circuit board 50 is arranged in a state in which the alignment projection 423 is inserted into the recess 53 and the height projection 421 is in contact with the circuit board 50.

According to this configuration, since the alignment projection 423 is inserted into the recess 53 of the circuit board 50, misalignment is less likely to occur. Further, when arranging the circuit board 50, the alignment projection 423 may be inserted into the recess 53, so that the alignment can be facilitated.

(Modification of Eleventh Embodiment)

Figure 23:
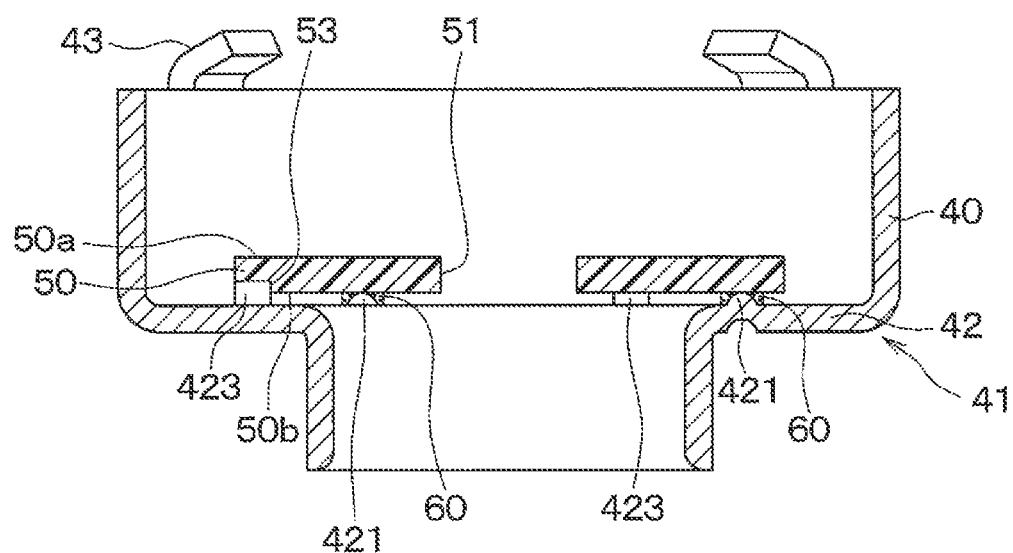
FIG. 23 is a cross-sectional view of a housing and a circuit board in a modified example of the eleventh embodiment.

A modification of the eleventh embodiment will be described. In the eleventh embodiment, as shown in FIG. 23, the alignment projection 423 may be formed separately from the height projection 421. Further, as shown in FIG. 23, the recess 53 may be formed at an outer edge portion of the circuit board 50. That is, the recess 53 may be a notch formed in the outer edge portion of the circuit board 50.

(Twelfth Embodiment)

A twelfth embodiment will be described. In the present embodiment, the circuit board 50 is provided with a conductive terminal portion as compared with the first embodiment. Descriptions of the same configurations and processes as those of the first embodiment will not be repeated hereinafter.

Figure 24:
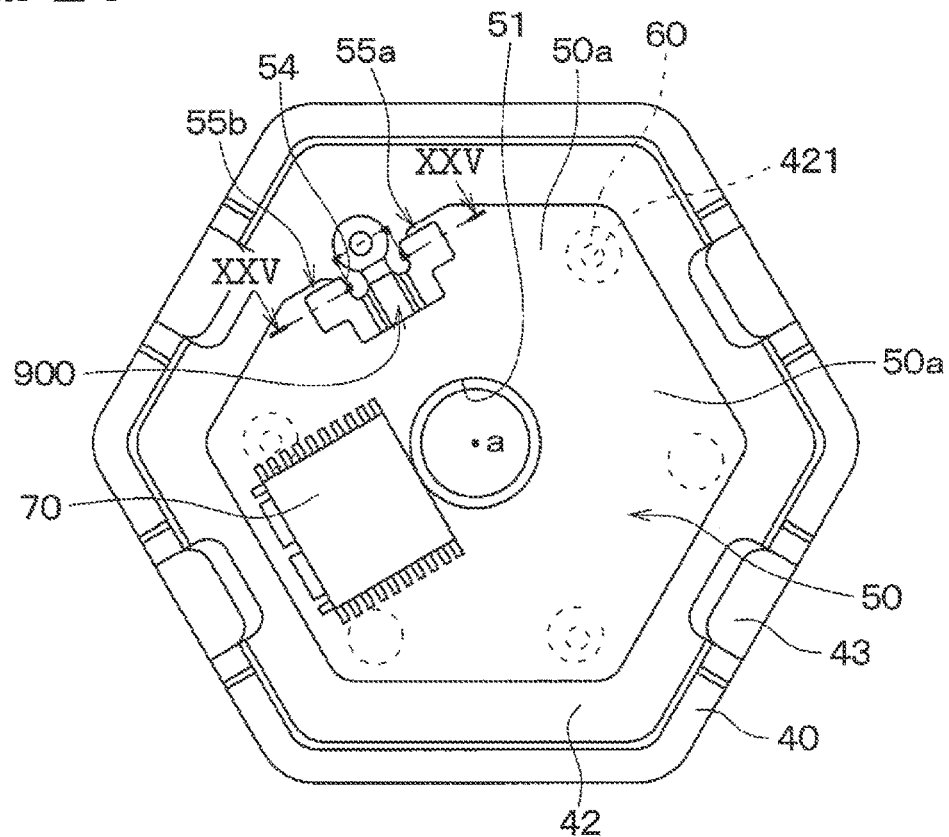
FIG. 24 is a plan view of a housing and a circuit board according to a twelfth embodiment.
Figure 25:
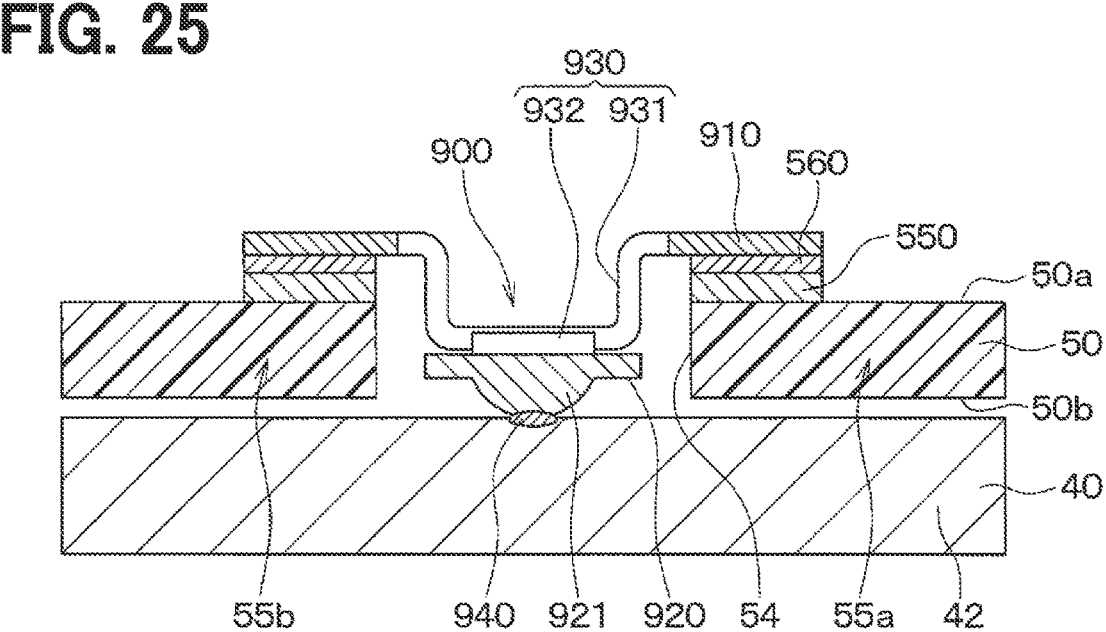
FIG. 25 is a cross-sectional view taken along the line XXV-XXV in FIG. 24.
Figure 26:
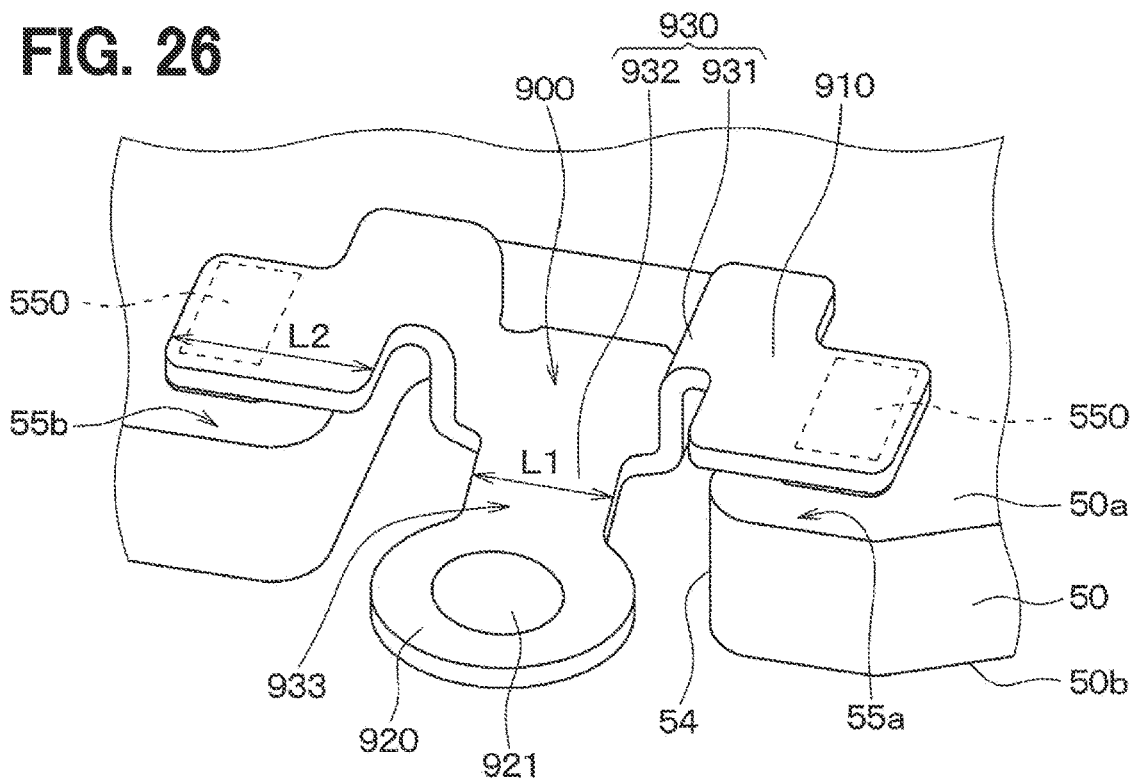
FIG. 26 is a perspective view of the vicinity of a conductive terminal portion of the circuit board shown in FIG. 24.

In the present embodiment, as shown in FIGS. 24 to 26, the circuit board 50 is formed with a pad portion 550 for the body ground on the surface 50a side. Specifically, the circuit board 50 is formed with a cutout portion 54 at the outer edge portion. In the present embodiment, the circuit board 50 has a hexagonal outer shape before the cutout portion 54 is formed, and the cutout portion 54 is formed by cutting out one corner portion forming the hexagonal shape. The pad portion 550 is arranged around the cutout portion 54. In the present embodiment, the pad portion 550 is formed in the regions 55a and 55b that sandwich the cutout portion 54.

At least the surface of the pad portion 550 is made of gold. Further, in FIG. 24 and the like, in the plan view of the circuit board 50, a predetermined wiring pattern and other wiring patterns connected to the pad portion 550 are omitted.

The conduction terminal portion 900 is arranged so as to be electrically connected to the pad portion 550 and electrically connected to the mounting portion 42 of the housing 40. The conductive terminal portion 900 have a board side connection portion 910 joined to the circuit board 50, a housing side connection portion 920 connected to the mounting portion 42 of the housing 40, and a connecting portion 930 connected the board side connection portion 910 and the housing side connection portion 920.

The board side connection portion 910 has a flat plate shape, and two board side connection portions 910 are provided so as to correspond to the shape of each pad portion 550. The housing side connection portion 920 has a disk shape, and a convex portion 921 as a projection is formed substantially in the center of the housing side connection portion 920.

The board side connection portion 910 and the housing side connection portion 920 are formed so as to be located on different surfaces. Further, the board side connection portion 910 and the housing side connection portion 920 are formed so that the housing side connection portion 920 does not intersect a virtual surface connecting the two board side connection portions 910. That is, the housing side connection portion 920 is arranged at a position protruding from the virtual surface connecting the two board side connection portions 910.

The connecting portion 930 has a board side connecting part 931 and a housing side connecting part 932. The board side connecting part 931 is connected to each board side connection portion 910 and extends from a portion where the board side connection portion 910 is located to a surface where the housing side connecting part 932 is located. The board side connecting part 931 extends along the normal direction with respect to the surface direction of the board side connection portion 910. The housing side connecting part 932 is provided so as to connect a portion of the board side connecting part 931 opposite to the board side connection portion 910 to the housing side connection portion 920.

Further, the connecting portion 930 has an elastic part 933 that can be elastically deformed. In the present embodiment, the elastic part 933 is provided on the housing side connecting part 932 by forming a portion having a lower rigidity than the board side connection portion 910 or the like on the housing side connecting part 932. For example, in the present embodiment, the housing side connecting part 932 has the same thickness as the board side connection portion 910 and the like, but a width L1 of the housing side connecting part 932 is narrower than the width L2 of the board side connection portion 910. As a result, the elastic part 933 is formed in the housing side connecting part 932.

Then, in the conduction terminal portion 900, the board side connection portion 910 is connected to each pad portion 550 formed on the surface 50a of the circuit board 50 via the solder 560. Further, the conductive terminal portion 900 is arranged so that the housing side connection portion 920 is located on the back surface 50b side of the circuit board 50 by arranging the board side connecting part 931 in the cutout portion 54.

At this time, the conduction terminal portion 900 is arranged so as not to protrude outward from the outer edge of the circuit board 50 before forming the cutout portion 54. That is, in the conduction terminal portion 900, the housing side connection portion 920 and the connecting portion 930 are housed in the cutout portion 54 in the normal direction with respect to the surface direction of the circuit board 50. That is, in the present embodiment, the cutout portion 54 and the conduction terminal portion 900 are sized and shaped so as not to project outward from the outer edge of the circuit board 50 before the conduction terminal portion 900 forms the cutout portion 54 when the conduction terminal portion 900 is arranged. Further, the conductive terminal portion 900 is arranged so that the center of gravity of the conductive terminal portion 900 is located at the center of the two pad portions 550 in the normal direction with respect to the surface direction of the circuit board 50.

Then, the housing side connection portion 920 is connected to the mounting portion 42 of the housing 40 by resistance welding. That is, the housing side connection portion 920 and the mounting portion 42 of the housing 40 are electrically connected via the welded portion 940. As a result, the pad portion 550 of the circuit board 50 is connected to the mounting portion 42 of the housing 40 via the conduction terminal portion 900 to the body ground. In the conduction terminal portion 900, after the board side connection portion 910 is connected to the pad portion 550 of the circuit board 50, the housing side connection portion 920 is resistance welded to the mounting portion 42 of the housing 40.

Similar to the housing 40 described with reference to FIG. 19 of the ninth embodiment, the housing 40 of the present embodiment has three height projections 421 on the mounting portion 42 at equal intervals in the circumferential direction about the central axis a. The circuit board 50 has a structure in which the cutout portion 54 is formed at one corner of the hexagonal shape, and the three height projections 421 are arranged so as to be close to each of the three corners of the hexagonal shape. That is, the circuit board 50 is arranged so that one height projection 421 is located on the opposite side of the conduction terminal portion 900 with respect to the central axis a.

Further, the circuit board 50 is mechanically connected to the mounting portion 42 of the housing 40 via the joining member 60 arranged between the mounting portion 42 of the housing 40 and the circuit board 50. In the present embodiment, the circuit board 50 is electrically connected to the mounting portion 42 of the housing 40 via the conductive terminal portion 900. Therefore, as the joining member 60, a member that connects the circuit board 50 and the mounting portion 42 of the housing 40 only mechanically may be used, and for example, a silicone-based adhesive or the like is used.

The joining members 60 are arranged at five locations in the present embodiment. Specifically, the three joining members 60 are arranged around the height projections 421. Further, the two joining members 60 are arranged near the corners of the circuit board 50, which are different from the corners where the height projections 421 are arranged. That is, the two joining members 60 are arranged in the center of the circumferential direction between the first height projection 421 located on the opposite side of the conduction terminal portion 900 with respect to the central axis a, and each second height projection 421 adjacent to the first height projection 421.

As described above, in the present embodiment, the pad portion 550 for the body ground is formed on the circuit board 50, and the pad portion 550 is electrically connected to the mounting portion 42 of the housing 40 via the conduction terminal portion 900. The conduction terminal portion 900 is joined to the mounting portion 42 of the housing 40 via the welded portion 940. Further, the circuit board 50 is mechanically connected to the mounting portion 42 of the housing 40 via the joining member 60. Therefore, it is possible to improve the bondability between the circuit board 50 and the mounting portion 42 of the housing 40, and to stabilize the electrical connection between the pad portion 550 of the circuit board 50 and the mounting portion 42 of the housing 40.

That is, for example, when the circuit board 50 is connected to the housing 40 by the body ground, a pad portion for the body ground is formed on the back surface 50b side of the circuit board 50, and a conductive member made of silver paste is arranged between the pad portion and the mounting portion 42 of the housing 40. Therefore, it is conceivable to connect the pad portion and the housing 40 to the body ground. At least the surface of the pad portion is made of gold.

However, in this configuration, the bondability between the conductive member made of silver paste and the pad portion made of gold tends to be low, and the thickness of the conductive member tends to vary. Therefore, in this configuration, there is a concern that the contact resistance varies between the pad portion 550 and the mounting portion 42 of the housing 40, and the stability of the electrical connection may decrease.

On the other hand, in the present embodiment, since the mounting portion 42 of the housing 40 and the conductive terminal portion 900 electrically connected via the welded portion 940 are used, the stability of the electrical connection between the circuit board 50 and the mounting portion 42 of the housing 40 can be achieved. The solder 560 is arranged between the board side connection portion 910 and the pad portion 550, but the solder 560 has higher bondability with gold constituting the pad portion 550 than silver and is easy to stabilize. Therefore, the thickness of the solder 560 is unlikely to vary, and variation in contact resistance is suppressed. That is, the board side connection portion 910 and the pad portion 550 are connected via the solder 560 in an electrically stable state.

Further, in the present embodiment, the pad portion 550 is formed on the surface 50a of the circuit board 50 and is connected to the board side connection portion 910 of the conduction terminal portion 900 via the solder 560. Therefore, the solder 560 can be arranged at the same time as the solder paste or the like when the electronic component 70 is arranged on the circuit board 50. Therefore, it is possible to prevent the manufacturing process from becoming complicated.

Further, the conductive terminal portion 900 is configured to have the elastic part 933 at the connecting portion 930. Therefore, when the convex portion 921 of the housing side connection portion 920 is resistance welded to the mounting portion 42 of the housing 40, the elastic part 933 is elastically deformed. Therefore, it is possible to prevent excessive stress from being propagated to the board side connection portion 910. That is, it is possible to prevent problems such as the board side connection portion 910 being peeled off from the pad portion 550.

Further, the conductive terminal portion 900 is arranged so that the center of gravity of the conductive terminal portion 900 is located at the center of the two pad portions 550 in the normal direction with respect to the surface direction of the circuit board 50. Therefore, before connecting the conductive terminal portion 900 to the mounting portion 42 of the housing 40, the inclination of the conductive terminal portion 900 can be suppressed, and it is possible to prevent the process of resistance welding the housing side connection portion 920 to the mounting portion 42 of the housing 40 from becoming complicated.

Further, the conduction terminal portion 900 is arranged so as not to protrude outward from the outer edge of the circuit board 50 before forming the cutout portion 54. Therefore, by arranging the conduction terminal portion 900, it is possible to prevent the pressure sensor from becoming large.

(Modification of Twelfth Embodiment)

The modification of the twelfth embodiment will be described below. In the twelfth embodiment, the example in which the cutout portion 54 is formed in the outer edge of the circuit board 50 has been described. However, a through hole is formed in the inner edge of the circuit board 50, and the conduction terminal portion 900 is arranged in the through hole.

Further, in the twelfth embodiment, the pad portion 550 may be formed on the back surface 50b side of the circuit board 50, and the board side connection portion 910 of the conduction terminal portion 900 may connect to the pad portion 550 on the back surface 50b side of the circuit board 50. In this case, the shape of the conductive terminal portion 900 is appropriately adjusted so that it can be connected to the back surface 50b side of the circuit board 50.

(Thirteenth Embodiment)

A thirteenth embodiment will be described. The present embodiment is a modification of the configuration of the conductive terminal portion 900 with respect to the twelfth embodiment. Descriptions of the same configurations and processes as those of the twelfth embodiment will not be repeated hereinafter.

Figure 27:
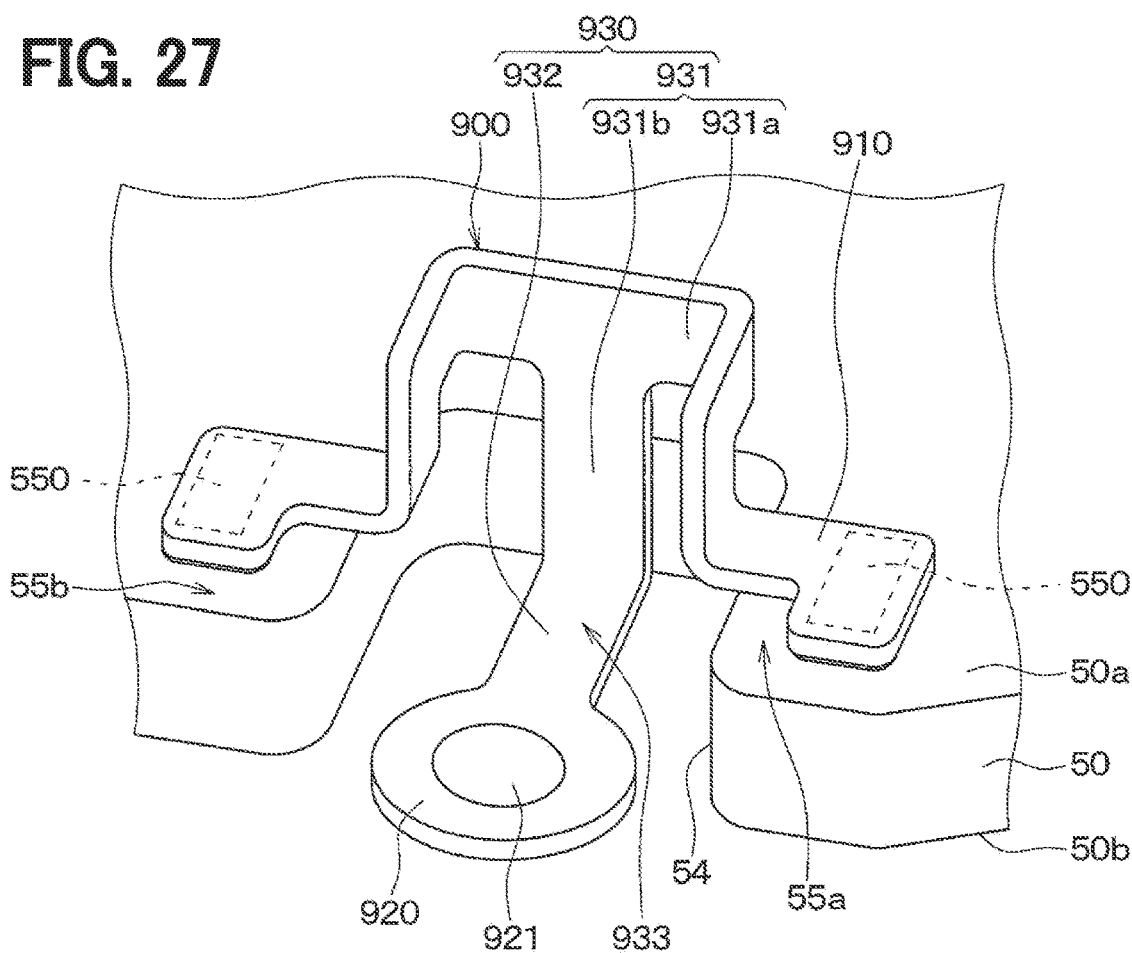
FIG. 27 is a perspective view of the vicinity of a conductive terminal portion of the circuit board according to a thirteenth embodiment.

In the present embodiment, as shown in FIG. 27, the board side connecting part 931 of the conductive terminal portion 900 is connected to the board side connection portion 910, and has a first connecting part 931a extending to the side opposite to the housing side connection portion 920 from the board side connection portion 910 and a second connecting part 931b connecting the first connecting part 931a and the housing side connecting part 932. That is, a part of the conduction terminal portion 900 is in a state of protruding from the surface 50a side of the circuit board 50.

The elastic part 933 is composed of the housing side connecting part 932 and the second connecting part 931b. Specifically, the second connecting part 931b is made into the elastic part 933 by having the same width as the housing side connecting part 932. That is, as compared with the first embodiment, the region of the elastic part 933 in the conductive terminal portion 900 is larger.

As described above, in the present embodiment, the elastic part 933 has the housing side connecting part 932 and the second connecting part 931b. Therefore, when the convex portion 921 of the housing side connection portion 920 is resistance welded to the mounting portion 42 of the housing 40, the elastic part 933 is elastically deformed. Therefore, it is possible to prevent excessive stress from being propagated to the board side connection portion 910.

(Other Embodiments)

Although the present disclosure has been described in accordance with the embodiments, it is understood that the present disclosure is not limited to such embodiments or structures. The present disclosure encompasses various modifications and variations within the scope of equivalents. Furthermore, various combinations and aspects, and other combination and aspect including only one element, more than one element or less than one element, are also within the sprit and scope of the present disclosure.

For example, in the second to eleventh embodiments, the first stem 101 and the second stem 102 may be configured by using the same material. Further, the alignment portion 122 may not be formed on the second stem 102. Then, in the second, third, fifth to eleventh embodiments, the stem 10 may be composed of a single member instead of the configuration having the first stem 101 and the second stem 102.

In addition, each of the above embodiments can be combined as appropriate. For example, by combining the second embodiment with the third to thirteenth embodiments, the low doping layer 23 may be arranged, or the pad portion 33 may be connected only to the extending portion 322. Further, the position where the opening 21a is formed may be defined, by combining the third embodiment with the fourth to thirteenth embodiments. Further, the thin-walled portion 111 may be formed on the first stem 101 by combining the fourth embodiment with the fifth to thirteenth embodiments. Then, by combining the fifth embodiment with the sixth to thirteenth embodiments, the facing lands 501c may be configured by connecting a plurality of adjacent electrode lands. Further, the guard pattern 521 may be formed on the circuit board 50 by combining the sixth embodiment with the seventh to thirteenth embodiments. Further, by combining the seventh embodiment with the eighth to thirteenth embodiments, the protective layer 530 of the circuit board 50 may be formed with the opening 531 that reaches the through hole 51 while exposing the element land 503. Then, by combining the eighth embodiment with the ninth to thirteenth embodiments, the dam portion 540 may be provided between the element lands 503 and the external connection lands 502a to 502c with respect to the protective layer 530 of the circuit board 50. Further, by combining the tenth embodiment with the eleventh to thirteenth embodiments, the circuit board 50 may be supported by the mounting portion 42 of the housing 40 at two locations. Further, by combining the eleventh embodiment with the twelfth and thirteenth embodiments, the height projection 421 and the alignment projection 423 may be formed on the housing 40. Further, a combination of the above embodiments may be further combined.

What is claimed is:

1. A pressure sensor that detects a pressure of a pressure medium, comprising: a stem having a pressure introduction hole into which the pressure medium is introduced, and a diaphragm that is deformable according to the pressure of the pressure medium; and a strain detecting element being arranged on the diaphragm via an insulating film and being configured to output a detection signal according to the deformation of the diaphragm, wherein the strain detecting element has a portion made of polysilicon, and a doping layer having a higher electrical resistivity than the polysilicon and a higher crystallinity than the insulating film is arranged between the insulating film and the strain detecting element.

2. The pressure sensor according to claim 1, wherein
the strain detecting element has a plurality of gauge resistors composed of the polysilicon and whose resistance value changes according to deformation of the diaphragm, and a wiring layer connecting the gauge resistors so as to form a bridge circuit, and a pad portion composed of an electrode film and connected to the wiring layer, the wiring layer has a connecting portion for connecting adjacent gauge resistors so as to form the bridge circuit, and an extending portion drawn out from the connecting portion, and the pad portion is connected only to the extending portion.

3. The pressure sensor according to claim 1, wherein the strain detecting element has a plurality of gauge resistors composed of the polysilicon and whose resistance value changes according to deformation of the diaphragm, and a wiring layer connecting the gauge resistors so as to form a bridge circuit, and a pad portion composed of an electrode film and connected to the wiring layer, the wiring layer has a connecting portion for connecting adjacent gauge resistors so as to form the bridge circuit, and an extending portion drawn out from the connecting portion, a protective film covers the strain detecting element, and has an opening for exposing the pad portion on the diaphragm, and the opening is formed inside the extending portion in a normal direction with respect to a surface direction of the diaphragm without intersecting an end of the extending portion.

4. The pressure sensor according to claim 1, wherein the stem has a first stem forming a diaphragm side and a second stem forming an opening end side of the pressure introduction hole, wherein the first stem and the second stem are joined by a welded portion, the first stem has a wall portion formed between the welded portion and the diaphragm, and a thickness of the wall portion between an inner wall surface and an outer wall surface is thinner than that of a portion where the welded portion is formed.

* * * * *